United States Patent
Zhuang et al.

(10) Patent No.: US 11,671,364 B2
(45) Date of Patent: *Jun. 6, 2023

(54) METHOD, APPARATUS, AND SYSTEM FOR FORWARDING PACKET IN SERVICE FUNCTION CHAINING SFC

(71) Applicant: HUAWEI TECHNOLOGIES CO., LTD., Guangdong (CN)

(72) Inventors: Shunwan Zhuang, Beijing (CN); Junlin Zhang, Beijing (CN); Nan Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 22 days.

This patent is subject to a terminal disclaimer.

(21) Appl. No.: 17/367,911

(22) Filed: Jul. 6, 2021

(65) Prior Publication Data

US 2021/0336882 A1  Oct. 28, 2021

Related U.S. Application Data

(63) Continuation of application No. 16/236,593, filed on Dec. 30, 2018, now Pat. No. 11,075,839, which is a
(Continued)

(51) Int. Cl.
*H04L 45/745* (2022.01)
*H04L 45/302* (2022.01)
(Continued)

(52) U.S. Cl.
CPC ............ *H04L 45/745* (2013.01); *H04L 12/66* (2013.01); *H04L 45/306* (2013.01); *H04L 41/0803* (2013.01); *H04L 47/17* (2013.01)

(58) Field of Classification Search
None
See application file for complete search history.

(56) References Cited

U.S. PATENT DOCUMENTS

| | | | |
|---|---|---|---|
| 8,611,359 B1* | 12/2013 | Kompella | H04L 45/04 370/401 |
| 8,665,887 B2* | 3/2014 | Ge | H04L 45/04 713/153 |

(Continued)

FOREIGN PATENT DOCUMENTS

| | | |
|---|---|---|
| CN | 101909005 A | 12/2010 |
| CN | 103179038 A | 6/2013 |

(Continued)

OTHER PUBLICATIONS

E. Chen, Ed. et al:"Revised Error Handling for BGP Update Messages",rfc7606,Aug. 2015,total 19 pages.
(Continued)

*Primary Examiner* — Bob A Phunkulh
(74) *Attorney, Agent, or Firm* — Huawei Technologies Co., Ltd.

(57) ABSTRACT

The disclosure discloses a method. The method includes: determining, by a control node, routing entry information of a service function forwarding node in a SFP in the SFC, where the routing entry information records a mapping relationship between route prefix information and next hop information, the route prefix information includes a SPI and a SI, the SPI is used to identify the SFP, the SI is used to identify a location of the service function forwarding node in the SFP, and the next hop information is used to indicate a next hop node of the service function forwarding node in the SFP; and sending, by the control node, the routing entry information to the service function forwarding node, where the routing entry information is used by the service function forwarding node to generate a forwarding table used to instruct the service function forwarding node to forward a packet.

20 Claims, 8 Drawing Sheets

Related U.S. Application Data continuation of application No. PCT/CN2016/088246, filed on Jul. 1, 2016.

(51) Int. Cl.
 *H04L 12/66* (2006.01)
 *H04L 47/17* (2022.01)
 *H04L 41/0803* (2022.01)

(56) References Cited

U.S. PATENT DOCUMENTS

| | | | |
|---|---|---|---|
| 8,861,345 B2* | 10/2014 | Hares | H04L 9/40 709/224 |
| 9,106,530 B1* | 8/2015 | Wang | H04L 12/4641 |
| 9,137,116 B1* | 9/2015 | Rijsman | H04L 67/10 |
| 9,660,897 B1* | 5/2017 | Gredler | H04L 45/50 |
| 9,825,856 B2 | 11/2017 | Yong et al. | |
| 10,003,530 B2 | 6/2018 | Zhang et al. | |
| 10,116,553 B1 | 10/2018 | Penno et al. | |
| 11,558,246 B2* | 1/2023 | Krug | H04L 45/74 |
| 2007/0091796 A1* | 4/2007 | Filsfils | H04L 45/00 370/228 |
| 2008/0170573 A1* | 7/2008 | Ould-Brahim | H04L 12/4633 370/392 |
| 2008/0170578 A1* | 7/2008 | Ould-Brahim | H04L 12/4641 370/401 |
| 2010/0329270 A1* | 12/2010 | Asati | H04L 45/02 370/401 |
| 2015/0071285 A1 | 3/2015 | Kumar et al. | |
| 2015/0138973 A1 | 5/2015 | Kumar et al. | |
| 2015/0295831 A1 | 10/2015 | Kumar et al. | |
| 2015/0365324 A1 | 12/2015 | Kumar et al. | |
| 2016/0014016 A1 | 1/2016 | Guichard et al. | |
| 2016/0028640 A1 | 1/2016 | Zhang et al. | |
| 2016/0119226 A1 | 4/2016 | Guichard et al. | |
| 2016/0119253 A1 | 4/2016 | Kang et al. | |
| 2016/0165014 A1 | 6/2016 | Nainar et al. | |
| 2016/0205018 A1 | 7/2016 | Li et al. | |
| 2017/0012865 A1 | 1/2017 | Nainar et al. | |
| 2017/0019334 A1 | 1/2017 | Meng et al. | |
| 2017/0019373 A1 | 1/2017 | Meng et al. | |
| 2017/0064039 A1* | 3/2017 | Shen | H04L 45/306 |
| 2017/0093641 A1* | 3/2017 | Utgikar | H04L 41/12 |
| 2017/0244631 A1* | 8/2017 | Guichard | H04L 45/74 |
| 2017/0257310 A1 | 9/2017 | Patil et al. | |
| 2017/0264537 A1* | 9/2017 | Patil | H04L 45/566 |
| 2017/0279712 A1 | 9/2017 | Nainar et al. | |
| 2017/0331669 A1 | 11/2017 | Ganesh et al. | |
| 2018/0091420 A1* | 3/2018 | Drake | H04L 45/306 |
| 2018/0102919 A1* | 4/2018 | Hao | H04L 41/50 |
| 2018/0109450 A1* | 4/2018 | Filsfils | H04L 45/04 |
| 2018/0198705 A1 | 7/2018 | Wang et al. | |
| 2019/0014454 A1 | 1/2019 | Garcia Martin et al. | |
| 2019/0132232 A1* | 5/2019 | Ammireddy | H04L 12/1854 |
| 2019/0173778 A1 | 6/2019 | K et al. | |
| 2022/0021646 A1* | 1/2022 | Joshi | H04L 67/1001 |

FOREIGN PATENT DOCUMENTS

| | | |
|---|---|---|
| CN | 104639414 A | 5/2015 |
| CN | 104869065 A | 8/2015 |
| CN | 104954274 A | 9/2015 |
| CN | 104980374 A | 10/2015 |
| CN | 105577413 A | 5/2016 |
| CN | 105577579 A | 5/2016 |
| CN | 105681196 A | 6/2016 |
| WO | 2015143802 A1 | 10/2015 |
| WO | 2016094907 A1 | 6/2016 |

OTHER PUBLICATIONS

Li Sufen et al, Business chain research status and operator development recommendations. Telecommunications Technology, Editorial Office, 2015, Issue 09, 4 pages.

A. Farrel et al: "BGP Control Plane for NSH SFC, draft-mackie-bess-nsh-bgp-control-plane-00", Oct. 14, 2016 XP055575520, 37 pages.

K. Lougheed et al: "A Border Gateway Protocol (BGP)", Network Working Group, rfc1105, Jun. 1989, 17 pages.

K. Lougheed et al: "A Border Gateway Protocol (BGP)", Network Working Group, rfc1163, Jun. 1990, 29 pages.

K. Lougheed et al A Border Gateway Protocol 3 (BGP-3), Network Working Group, rfc1267, Oct. 1991, 35 pages.

Y. Rekhter, Ed et al: "A Border Gateway Protocol 4 (BGP-4)", Network Working Group, Category: Standards Track, rfc4271, Jan. 2006, 104 pages.

T. Bates et al: "Multiprotocol Extensions for BGP-4", Network Working Group, Category: Standards Track, rfc4760, Jan. 2007, 12 pages.

J. Reynolds et al. Assigned Numbers. Network Working Group, RFC1700. Oct. 1994. 230 pages.

J. Scudder et al, Capabilities Advertisement with BGP-4. RFC5492, Feb. 2009, 7 pages.

T. Bates et al, BGP Route Reflection: An Alternative to Full Mesh Internal BGP (IBGP). RFC4456, Apr. 2006, 12 pages.

D. Walton et al, Advertisement of Multiple Paths in BGP draft-ietf-idr-add-paths-10, Oct. 24, 2014, 8 pages.

E. Rosen, BGPMPLS IP Virtual private networks(vpns),RFC4364. 2006.2, 42 pages.

H. Gredler et al, North-Bound Distribution of Link-State and TE Information using BGP draft-ietf-idr-ls-distribution-11, Jun. 4, 2015, 45 pages.

X. Xu, BGP Link-State Extensions for SR-based SFC, draft-xu-idr-bgp-ls-sfc-extension-00, Network Working Group, Apr. 28, 2014, 5 pages.

Weiguo Hao et al., Dissemination of Flow Specification Rules for NVO3, draft-hao-idr-flowspec-nvo3-00, Internet Draft, Jul. 6, 2015, 10 pages.

* cited by examiner

US 11,671,364 B2

METHOD, APPARATUS, AND SYSTEM FOR FORWARDING PACKET IN SERVICE FUNCTION CHAINING SFC

CROSS-REFERENCE TO RELATED APPLICATIONS

This application is a continuation of U.S. patent application Ser. No. 16/236,593, filed on Dec. 30, 2018, which is a continuation of International Application No. PCT/CN2016/088246, filed on Jul. 1, 2016. Both of the aforementioned applications are hereby incorporated by reference in their entireties.

TECHNICAL FIELD

Embodiments of the present application relate to the communications field, and to a method, an apparatus, and a system for forwarding a packet in service function chaining (SFC).

BACKGROUND

Service function chaining (SFC) is a mechanism for deploying a value-added service. In network communications, the SFC is formed by combining a group of devices that have service processing functions (for example, a firewall (firewall), network address translation (NAT), and deep packet inspection (DPI)) in an orderly manner, and allowing traffic to pass through these service functions. A basic architecture of the SFC includes a control node, a classification node, a service function forwarding node, a service function node, and the like.

An SFC service is deployed in software-defined networking (SDN). The SDN includes a controller (which is an example of the control node) and an SDN routing and switching device (which is an example of the service function forwarding node). The controller and the SDN routing and switching device deliver a forwarding entry (for example, a flow table) in a point-to-point manner by using a southbound interface protocol, for example, OpenFlow. This service function forwarding node is an SDN-only routing and switching device that supports only an operation defined by the OpenFlow specification.

However, in an existing SDN, a mainstream SDN routing and switching device is an SDN hybrid routing and switching device, for example, an OpenFlow-hybrid switch. This SDN hybrid routing and switching device is usually implemented based on hardware improvements of a conventional routing and switching device. The hardware improvements for the conventional routing and switching device that are made by vendors are private extensions, and the private extensions of the vendors are not unified. Consequently, interaction between the conventional routing and switching device and the controller cannot be standardized, and interconnection of an SFC service between the controller and the routing and switching device is difficult to implement.

SUMMARY

The present application provides a method, an apparatus, and a system for forwarding a packet in service function chaining (SFC). Interaction between a routing and switching device and a controller is standardized, to implement smooth interconnection of an SFC service between the controller and the routing and switching device.

According to a first aspect, the present application provides a method for forwarding a packet in SFC, where the method includes: determining, by a control node, routing entry information of a service function forwarding node in a service function path (SFP) in the SFC, where the routing entry information records a mapping relationship between route prefix information and next hop information, the route prefix information includes a service path identifier (SPI) and a service index (SI), the SPI is used to identify the SFP, the SI is used to identify a location of the service function forwarding node in the SFP, and the next hop information is used to indicate a next hop node of the service function forwarding node; and sending, by the control node, the routing entry information to the service function forwarding node, where the routing entry information is used by the service function forwarding node to generate a forwarding table, and the forwarding table is used to instruct the service function forwarding node to forward a packet.

Therefore, according to the method for forwarding a packet in the SFC in this embodiment of the present application, the control node directly delivers the routing entry information to the service function forwarding node, the service function forwarding node generates the forwarding table, and interaction between the control node and the service function forwarding node is standardized by using a mature protocol, to implement smooth interconnection of an SFC service between the control node and the service function forwarding node.

Further, the SPI and the SI are used as routes in a conventional routing and switching device to direct the packet. To be specific, a routing policy that exists in an existing SDN device is used to flexibly process the routes that exist in a "SPI and SI" manner. Compared with an existing conventional routing and switching device, the routing and switching device in the present application is more convenient and flexible.

With reference to the first aspect, in a first possible implementation of the first aspect, the sending, by the control node, the routing entry information to the service function forwarding node includes: generating, by the control node, a Border Gateway Protocol (BGP) update packet, where the BGP update packet carries the routing entry information; and sending, by the control node, the BGP update packet to the service function forwarding node.

With reference to the first aspect and the foregoing possible implementation, in a second possible implementation of the first aspect, the generating, by the control node, a BGP update packet, where the BGP update packet carries the routing entry information includes: generating, by the control node, the BGP update packet, where the BGP update packet includes a multiprotocol reachable network layer reachability information (MP_REACH_NLRI) attribute field, the MP_REACH_NLRI attribute field includes a subsequent address family identifier (SAFI) field, an NLRI field, and a next hop information field, the SAFI field indicates that the MP_REACH_NLRI attribute field is encapsulated based on an encapsulation format supported by an SFC synchronization address family, the NLRI field includes a type-length-value (TLV) field, a type T field of the TLV field indicates that a type of the TLV field is an SFC routing entry synchronization type, a value V field of the TLV field carries the SPI and the SI, and the next hop information field carries the next hop information.

An extension is performed based on an existing BGP protocol. To be specific, an NLRI field in a BGP Flow Spec packet carries match item information, and a redirected extended community attribute field in the BGP Flow Spec packet carries to-be-executed action domain information.

With reference to the first aspect and the foregoing possible implementations, in a third possible implementation of the first aspect, the routing entry information further includes route attribute information, and the route attribute information includes at least one of the following traffic distribution parameter types: weight, cost, and bandwidth, where the BGP update packet further includes a BGP SFC attribute field, the BGP SFC attribute field includes at least one sub-TLV field, and each traffic distribution parameter type corresponds to one of the at least one sub-TLV field. Each sub-TLV field includes a T field, an L field, and a V field, where the T field indicates any one of the traffic distribution parameter types, and the V field indicates a parameter used to distribute, based on a corresponding traffic distribution parameter type, traffic carried by the packet.

The route attribute information is carried in the routing entry information, and the service function forwarding node can distribute traffic based on the traffic distribution parameters included in the route attribute information, so that traffic is distributed more properly and flexibly in the SFC.

According to a second aspect, the present application provides a method for forwarding a packet in SFC, where the method includes: receiving, by a service function forwarding node, routing entry information sent by a control node, where the routing entry information records a mapping relationship between route prefix information and next hop information, the route prefix information includes a service path identifier (SPI) and a service index (SI), the SPI is used to identify an SFP, the SI is used to identify a location of the service function forwarding node in the SFP, and the next hop information is used to indicate a next hop node of the service function forwarding node; and storing, by the service function forwarding node, the routing entry information into a routing table of the service function forwarding node, so that the service function forwarding node generates a forwarding table based on the routing table, and forwards a packet based on the forwarding table.

Therefore, according to the method for forwarding a packet in the SFC in this embodiment of the present application, the control node directly delivers the routing entry information to the service function forwarding node, the service function forwarding node generates the forwarding table, and interaction between the control node and the service function forwarding node is standardized by using a mature protocol, to implement smooth interconnection of an SFC service between the control node and the service function forwarding node.

Further, the SPI and the SI are used as routes in a conventional routing and switching device to direct the packet. To be specific, a routing policy that exists in an existing SDN device is used to flexibly process the routes that exist in a "SPI and SI" manner. Compared with an existing conventional routing and switching device, the routing and switching device in the present application is more convenient and flexible.

With reference to the second aspect, in a first possible implementation of the second aspect, the receiving, by a service function forwarding node, routing entry information sent by a control node includes: receiving, by the service function forwarding node, a Border Gateway Protocol (BGP) update packet sent by the control node, where the BGP update packet carries the routing entry information.

Further, the BGP update packet includes a multiprotocol reachable network layer reachability information (MP_REACH_NLRI) attribute field, the MP_REACH_NLRI attribute field includes a subsequent address family identifier (SAFI) field, an NLRI field, and a next hop information field, the SAFI field indicates that the MP_REACH_NLRI attribute field is encapsulated based on an encapsulation format supported by an SFC synchronization address family, the NLRI field includes a type-length-value (TLV) field, a type T field of the TLV field indicates that a type of the TLV field is an SFC routing entry synchronization type, a value V field of the TLV field carries the SPI and the SI, and the next hop information field carries the next hop information.

With reference to the second aspect and the foregoing possible implementation, in a second possible implementation of the second aspect, the routing entry information further includes route attribute information, and the route attribute information includes at least one of the following traffic distribution parameter types: weight, cost, and bandwidth, where the BGP update packet further includes a BGP SFC attribute field, the BGP SFC attribute field includes at least one sub-TLV field, and each traffic distribution parameter type corresponds to one of the at least one sub-TLV field. Each sub-TLV field includes a T field, an L field, and a V field, where the T field indicates any one of the traffic distribution parameter types, and the V field indicates a parameter used to distribute, based on a corresponding traffic distribution parameter type, traffic carried by the packet.

The route attribute information is carried in the routing entry information, and the service function forwarding node can distribute traffic based on the traffic distribution parameters included in the route attribute information, so that traffic is distributed more properly and flexibly in the SFC.

With reference to the second aspect and the foregoing possible implementations, in a third possible implementation of the second aspect, the storing, by the service function forwarding node, the routing entry information into a routing table of the service function forwarding node includes: searching, by the service function forwarding node based on the SPI and the SI, the routing table of the service function forwarding node for target routing entry information having the same SPI and SI; and updating, by the service function forwarding node, the target routing entry information based on the routing entry information when the target routing entry information is found; or storing, by the service function forwarding node, the routing entry information when the target routing entry information is not found.

By synchronization of the routing table with the control node, the routing table stored in the service function forwarding node can be updated in real time based on a change of a network, so that the service function forwarding node determines an optimal path based on a network status, generates the forwarding table, and forwards the packet based on the forwarding table.

According to a third aspect, the present application provides a method for forwarding a packet in SFC, where the method includes: determining, by a control node, forwarding entry information of a service function forwarding node in a service function path (SFP) in the SFC, where the forwarding entry information records a mapping relationship between forwarding prefix information and next hop information, the forwarding prefix information includes a service path identifier (SPI) and a service index (SI), the SPI is used to identify the SFP, the SI is used to identify a location of the service function forwarding node in the SFP, and the next hop information is used to indicate a next hop node of the service function forwarding node; generating, by the control node, a Border Gateway Protocol (BGP) packet, where the BGP packet carries the forwarding entry information; and sending, by the control node, the BGP packet to the service function forwarding node, where the forwarding entry information carried by the BGP packet is used to instruct the service function forwarding node to forward a packet.

Therefore, according to the method for forwarding a packet in the SFC in this embodiment of the present application, the control node directly delivers the forwarding entry information to the service function forwarding node by using the BGP packet, and the service function forwarding node can directly forward the packet based on the forwarding entry information. Interaction between the control node and the service function forwarding node is standardized by using a mature protocol, to implement smooth interconnection of an SFC service between the control node and the service function forwarding node.

Further, a control plane is separated from a forwarding plane, so that control planes of forwarding nodes are centralized on the controller, which helps to implement a centralized service deployment strategy and implement a centralized management and maintenance strategy.

With reference to the third aspect, in a first possible implementation of the third aspect, the generating, by the control node, a Border Gateway Protocol (BGP) packet, where the BGP packet carries the forwarding entry information includes: generating, by the control node, the BGP packet, where the BGP packet includes a multiprotocol reachable network layer reachability information (MP_REACH_NLRI) attribute field that is encapsulated based on an encapsulation format supported by an SFC synchronization address family, the MP_REACH_NLRI attribute field includes an NLRI field and a next hop information field, the NLRI field includes a type-length-value (TLV) field, a type T field of the TLV field indicates that a type of the TLV field is a forwarding entry synchronization type, a value V field of the TLV field carries the SPI and the SI, and the next hop information field carries the next hop information.

An extension is performed based on an existing BGP protocol. To be specific, an NLRI field in a BGP Flow Spec packet carries match item information, and a redirected extended community attribute field in the BGP Flow Spec packet carries to-be-executed action domain information.

With reference to the third aspect and the foregoing possible implementation of the third aspect, in a second possible implementation of the third aspect, the forwarding entry information includes forwarding attribute information, and the forwarding attribute information includes at least one of the following traffic distribution parameter types: weight, cost, and bandwidth, where the BGP packet includes a BGP SFC attribute field, the BGP SFC attribute field includes at least one sub-TLV field, and each traffic distribution parameter type corresponds to one of the at least one sub-TLV field. Each sub-TLV field includes a T field, a L field, and a V field, where the T field indicates any one of the traffic distribution parameter types, and the V field indicates a parameter used to distribute, based on a corresponding traffic distribution parameter type, traffic carried by the packet.

The route attribute information is carried in the forwarding entry information, and the service function forwarding node can distribute traffic based on the traffic distribution parameters included in the route attribute information, so that traffic is distributed more properly and flexibly in the SFC.

Optionally, the BGP packet is a BGP update packet.

According to a fourth aspect, the present application provides a method for forwarding a packet in SFC, where the method includes: receiving, by a service function forwarding node, a Border Gateway Protocol BGP packet sent by a control node, where the BGP packet carries forwarding entry information, the forwarding entry information records a mapping relationship between forwarding prefix information and next hop information, the forwarding prefix information includes a service path identifier (SPI) and a service index (SI), the SPI is used to identify an SFP, the SI is used to identify a location of the service function forwarding node in the SFP, and the next hop information is used to indicate a next hop node of the service function forwarding node; and storing, by the service function forwarding node, the forwarding entry information, so as to forward a packet based on the forwarding entry information.

Therefore, according to the method for forwarding a packet in the SFC in this embodiment of the present application, the control node directly delivers the forwarding entry information to the service function forwarding node by using the BGP packet, and the service function forwarding node can directly forward the packet based on the forwarding entry information. Interaction between the control node and the service function forwarding node is standardized by using a mature protocol, to implement smooth interconnection of an SFC service between the control node and the service function forwarding node.

Further, a control plane is separated from a forwarding plane, so that control planes of forwarding nodes are centralized on the controller, which helps to implement a centralized service deployment strategy and implement a centralized management and maintenance strategy.

With reference to the fourth aspect, in a first possible implementation of the fourth aspect, the BGP packet includes a multiprotocol reachable network layer reachability information (MP_REACH_NLRI) attribute field, the MP_REACH_NLRI attribute field includes a subsequent address family identifier (SAFI) field, an NLRI field, and a next hop information field, the SAFI field indicates that the MP_REACH_NLRI attribute field is encapsulated based on an encapsulation format supported by an SFC synchronization address family, the NLRI field includes a type-length-value (TLV) field, a type T field of the TLV field indicates that a type of the TLV field is an SFC forwarding entry synchronization type, a value V field of the TLV field carries the SPI and the SI, and the next hop information field carries the next hop information.

An extension is performed based on an existing BGP protocol. To be specific, an NLRI field in a BGP Flow Spec packet carries match item information, and a redirected extended community attribute field in the BGP Flow Spec packet carries to-be-executed action domain information.

With reference to the fourth aspect and the foregoing possible implementation of the fourth aspect, in a second possible implementation of the fourth aspect, the forwarding entry information includes forwarding attribute information, and the forwarding attribute information includes at least one of the following traffic distribution parameter types: weight, cost, and bandwidth, where the BGP packet includes a BGP SFC attribute field, the BGP SFC attribute field includes at least one sub-TLV field, and each traffic distribution parameter type corresponds to one of the at least one sub-TLV field. Each sub-TLV field includes a T field, a L field, and a V field, where the T field indicates any one of the traffic distribution parameter types, and the V field indicates a parameter used to distribute, based on a corresponding traffic distribution parameter type, traffic carried by the packet.

The forwarding attribute information is carried in the forwarding entry information, and the service function forwarding node can distribute traffic based on the traffic distribution parameters included in the forwarding attribute information, so that traffic is distributed more properly and flexibly in the SFC.

With reference to the fourth aspect and the foregoing possible implementations of the fourth aspect, in a third possible implementation of the fourth aspect, the storing, by the service function forwarding node, the forwarding entry information includes: searching, by the service function forwarding node based on the SPI and the SI, a forwarding table of the service function forwarding node for target forwarding entry information having the same SPI and SI; and updating, by the service function forwarding node, the target forwarding entry information based on the forwarding entry information when the target forwarding entry information is found; or storing, by the service function forwarding node, the forwarding entry information when the target forwarding entry information is not found.

By synchronization of the forwarding table with the control node, the forwarding table stored in the service function forwarding node can be updated in real time based on a change of a network, so as to directly forward, when a packet with same traffic characteristic information is received subsequently, the packet based on the forwarding entry information.

Optionally, the BGP packet is a BGP update packet.

According to a fifth aspect, the present application provides a control node, configured to perform the method according to the first aspect or any possible implementation of the first aspect. The control node includes a module configured to perform the method according to the first aspect or any possible implementation of the first aspect.

According to a sixth aspect, the present application provides a service function forwarding node, configured to perform the method according to the second aspect or any possible implementation of the second aspect. The service function forwarding node includes a module configured to perform the method according to the second aspect or any possible implementation of the second aspect.

According to a seventh aspect, the present application provides a system for forwarding a packet in SFC, including the control node provided in the fifth aspect and the service function forwarding node provided in the sixth aspect.

According to an eighth aspect, the present application provides a control node, configured to perform the method according to the third aspect or any possible implementation of the third aspect. The control node includes a module configured to perform the method according to the third aspect or any possible implementation of the third aspect.

According to a ninth aspect, the present application provides a service function forwarding node, configured to perform the method according to the fourth aspect or any possible implementation of the fourth aspect. The service function forwarding node includes a module configured to perform the method according to the fourth aspect or any possible implementation of the fourth aspect.

According to a tenth aspect, the present application provides a system for forwarding a packet in SFC, including the control node provided in the eighth aspect and the service function forwarding node provided in the ninth aspect.

According to an eleventh aspect, the present application provides a control node, where the control node includes a receiver, a transmitter, a memory, a processor, and a bus system. The receiver, the transmitter, the memory, and the processor are connected by using the bus system, the memory is configured to store an instruction, the processor is configured to execute the instruction stored in the memory to control the receiver to receive a signal and to control the transmitter to send a signal, and when the processor executes the instruction stored in the memory, the execution enables the processor to perform the method according to the first aspect or any possible implementation of the first aspect.

According to a twelfth aspect, the present application provides a service function forwarding node, where the service function forwarding node includes a receiver, a transmitter, a memory, a processor, and a bus system. The receiver, the transmitter, the memory, and the processor are connected by using the bus system, the memory is configured to store an instruction, the processor is configured to execute the instruction stored in the memory to control the receiver to receive a signal and to control the transmitter to send a signal, and when the processor executes the instruction stored in the memory, the execution enables the processor to perform the method according to the second aspect or any possible implementation of the second aspect.

According to a thirteenth aspect, the present application provides a control node, where the control node includes a receiver, a transmitter, a memory, a processor, and a bus system. The receiver, the transmitter, the memory, and the processor are connected by using the bus system, the memory is configured to store an instruction, the processor is configured to execute the instruction stored in the memory to control the receiver to receive a signal and to control the transmitter to send a signal, and when the processor executes the instruction stored in the memory, the execution enables the processor to perform the method according to the third aspect or any possible implementation of the third aspect.

According to a fourteenth aspect, the present application provides a service function forwarding node, where the service function forwarding node includes a receiver, a transmitter, a memory, a processor, and a bus system. The receiver, the transmitter, the memory, and the processor are connected by using the bus system, the memory is configured to store an instruction, the processor is configured to execute the instruction stored in the memory to control the receiver to receive a signal and to control the transmitter to send a signal, and when the processor executes the instruction stored in the memory, the execution enables the processor to perform the method according to the fourth aspect or any possible implementation of the fourth aspect.

The present application provides the method, the apparatus, and the system for forwarding a packet in SFC, so that interaction between the routing and switching device and the controller is standardized, to implement smooth interconnection of an SFC service between the controller and the routing and switching device.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following describes the technical solutions in embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

For ease of understanding and description of a method, an apparatus, and a system for forwarding a packet in SFC in the embodiments of the present application, an application scenario of the embodiments of the present application is first described with reference to FIG. 1.

Figure 1:
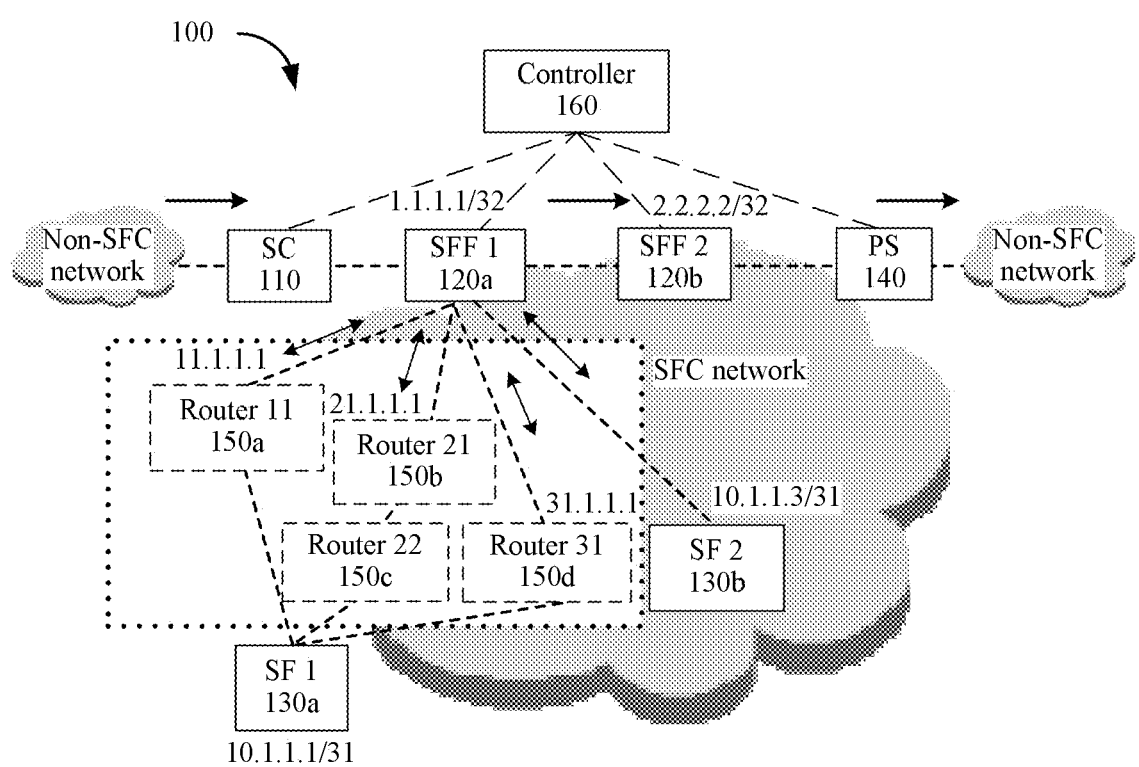
FIG. 1 is a schematic diagram of an application scenario according to an embodiment of the present application.

FIG. 1 is a schematic diagram of an application scenario according to an embodiment of the present application. As shown in FIG. 1, SFC 100 includes a service classification node (or a service classifier (SC)) 110, service function forwarding nodes (or service function forwarders (SFF)), service function nodes (or service function (SF) processors), a post service (PS) node 140, and a control node (or a controller) 160. For example, the SFFs include an SFF 1 120a and an SFF 2 120b; and the SFs include an SF 1 130a and an SF 2 130b.

Herein, it should be noted that the SFC is a virtual Overlay network of a basic underlying network (for example, an underlying IP network). The SFC includes some nodes (for example, nodes having service processing and forwarding functions) in the basic underlying network. To be specific, the nodes included in the SFC are not all physically and directly connected. For example, a network element node, such as a router or a switch, may be connected between SFF nodes.

In other words, in addition to the service classification node, the service function forwarding node, the service function node, and the post service node that are enumerated above, the SFC further includes a plurality of routing and switching devices in a physical network in which the SFC is located. The service classification node, the service function forwarding node, the service function node, the post service node, and the routing and switching devices that are enumerated above all may be referred to as network nodes. For ease of distinguishing, the service classification node, the service function forwarding node, the service function node, and the post service node that are in the SFC are collectively referred to as SFC nodes. The plurality of routing and switching devices in the physical network are configured to forward a packet from one SFC node to another SFC node. It should be understood that the SFC nodes enumerated above are merely described as examples, which should impose no limitation to the present application. The SFC node may further include another node configured to implement an SFC function in an SFC network. For brevity, details are not described herein.

It should also be understood that the SFC nodes enumerated above may be understood as functional modules, and are respectively configured to perform respective corresponding functions. Each SFC node may be deployed separately or a plurality of SFC nodes may be deployed in a combined manner. A specific deployment manner of each SFC node is not limited in the present application. For example, the SC and the SFF 1 may be deployed in one physical device in a combined manner. The physical device has a traffic matching function of the SC and a service forwarding function of the SFF 1, or has an SC module and an SFF module. In the following, unless otherwise stated, it is considered that the SC and the SFF 1 are deployed in a combined manner, that is, the SFF 1 deployed in a combined manner has functions of traffic matching and service forwarding.

As shown in FIG. 1, when the packet reaches the SFF 1 120a, the SFF 1 120a parses traffic characteristic information (for example, 5-tuple information) of traffic carried by the packet, filters the packet, and directs, to a corresponding service function path (SFP), a packet that matches a filter criterion (or a match item) of the traffic characteristic information. The SFF 1 120a, as a first service function forwarding node that the packet enters, encapsulates the packet based on the matched SFP. An encapsulated packet includes an SFC header, and the SFC header includes a service function path identifier (SPI) that is used to indicate the SFP that matches the packet. Then, the SFF 1 120a forwards the encapsulated packet to a next SFC node. The SFF 1 120a forwards the encapsulated packet to the SF 1 node 130a based on the SFP, the SF 1 node 130a returns the packet to the SFF 1 120a after processing the packet, the SFF 1 120a continues to forward, based on the SFP that matches the packet, the packet processed by the SF1 node 130*a* to the SFF 2 120*b*, and so on, until the packet is transmitted to the PS node 140 of the SFP of the packet.

The packet may be forwarded between SFC nodes, for example, between two service function forwarding nodes or between a service function forwarding node and a service function node, by using a plurality of routing and switching devices. In other words, there may be a plurality of channels between the two service function forwarding nodes or between the service function forwarding node and the service function node, and the plurality of channels are formed by different routing and switching devices together.

Referring to FIG. 1 again, the SFF 1 120*a* may reach the SF 1 130*a* by using a routing and switching device (for example, a router (Router) 11 150*a*), or the SFF 1 120*a* may reach the SF 1 130*a* by using a router 21 150*b* and a router 22 150*c*, or the SFF 1 120*a* may reach the SF 1 130*a* by using a router 31 150*d*. In other words, the packet may reach the SF 1 130*a* from the SFF 1 120*a* through three channels.

In this embodiment of the present application, to help to distinguish and understand, a link that connects two service function forwarding nodes is referred to as an SFP, and a link that is formed by routing and switching devices connected between two service function forwarding nodes or between the service function forwarding node and the service function node is referred to as a channel. It can be understood that a channel is a part of an SFP. One SFP may include different channels, or one SFP may correspond to a plurality of channels. This is not particularly limited in the present application. For example, SFF 1 120*a*→Router 11 150*a*→SF 1 130*a*, SFF 1 120*a*→Router 21 150*b*→Router 22 150*c*→SF 1 130*a*, and SFF 1 120*a*→Router 31 150*d*→SF 1 130*a* shown in FIG. 1 may be considered as three different channels that form a same SFP. It should be understood that a connection relationship between the SFP and the channels shown in FIG. 1 is merely described as an example, which should impose no limitation to the present application. A connection relationship between each SFC node and routing and switching devices is not limited to that shown in FIG. 1, and is not particularly limited in the present application.

During an actual forwarding process, the service function forwarding node may direct the packet to a next node by using next hop information corresponding to route prefix information. For example, a next hop node of the SFF 1 120*a* shown in FIG. 1 may be the router 11 150*a*, may be the router 21 150*b*, or may be the router 31 150*d*. The packet is forwarded from the SFF 1 120*a* to any one of the next hop nodes; the router 11 150*a*, the router 21 150*b*, and the router 31 150*d*, or the packet passes through any one of the foregoing three channels, and finally reaches a destination node (or a next SFC node), namely, SF 1 130*a*.

It should be noted that the route prefix information described herein and forwarding prefix information described in the following may be route prefix information used in the SFC, and are different from conventional route prefix information (for example, IP route prefix information).

It should be understood that, in the SFC, each service function forwarding node may be connected to at least one SFC node by using different routing and forwarding devices, and the at least one SFC node may be a service function node or may be a service function forwarding node. In other words, each service function forwarding node may be simultaneously located in at least one SFP. When the packet enters the first service function forwarding node of the SFP, the packet needs to be forwarded based on a forwarding entry corresponding to the SFP.

It can be learned from the foregoing that the SFC node transmits the packet based on the SFP. In other words, the packet is transmitted based on an SFC forwarding table. The SFC forwarding table is determined based on network topology information of the SFC. Therefore, before forwarding the packet, the control node (or the controller) needs to pre-configure a plurality of SFPs in the SFC based on related information of nodes such as the SC, the SFF, the SF, and the PS in the SFC, to match forwarding requirements of different packets. After being created, each new SFP is delivered to nodes (including SFF and SF nodes) in the SPF, to help the nodes and the control node to synchronize forwarding entry information.

It should be understood that an SFC service is deployed in an SDN. The SDN includes a controller (which is an example of the control node) and an SDN routing and switching device (which is an example of the service function forwarding node). The controller and the SDN routing and switching device implement synchronization of the forwarding entry by using a southbound interface protocol, for example, OpenFlow. After creating a routing entry for the new SFP, the controller may calculate, based on a flow table format supported by OpenFlow, to generate a flow table (which is an example of the forwarding table), and delivers the flow table to each service function forwarding node in a point-to-point manner. Each service function forwarding node forwards the packet based on the received flow table. This service function forwarding node is an SDN-only routing and switching device that supports only an operation defined by the OpenFlow specification, for example, an OpenFlow-only switch.

In an existing SDN, this SDN-only routing and switching device is usually a virtual switch implemented by using a software-only forwarding technology, for example, an Open vSwitch (OVS). An OpenFlow-only switch implemented by a hardware forwarding technology is limited by a chip technology and still requires a relatively long research and development time. Therefore, a mainstream SDN routing and switching device is still an SDN hybrid routing and switching device, for example, an OpenFlow-hybrid switch. This SDN hybrid routing and switching device is usually implemented based on hardware improvements of a conventional routing and switching device. However, the hardware improvements for the conventional routing and switching device that are made by vendors are private extensions, and the private extensions of the vendors are not unified. Consequently, interaction between the conventional routing and switching device and the controller cannot be standardized, and interconnection of an SFC service between the controller and the routing and switching device is difficult to implement.

Therefore, the present application provides an SFC-based packet forwarding method to standardize interaction between the routing and switching device and the controller, and resolve a problem of difficult interconnection between the controller and the routing and switching device during synchronization of the forwarding entry.

The following describes in detail a method for forwarding a packet in SFC according to an embodiment of the present application with reference to FIG. 2 to FIG. 6.

Figure 2:
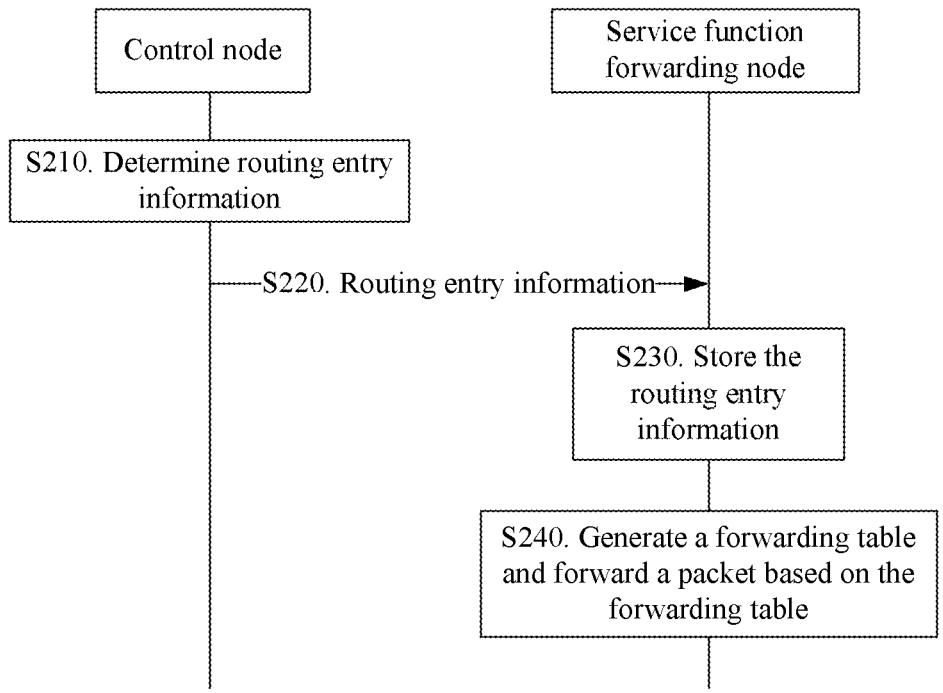
FIG. 2 is a schematic flowchart of a method for forwarding a packet in SFC according to an embodiment of the present application.

FIG. 2 is a schematic flowchart of a method 200 for forwarding a packet in SFC according to an embodiment of the present application. It should be understood that FIG. 2 shows detailed communication steps or operations of the method for forwarding a packet in the SFC, but these steps or operations are merely examples, and other operations or variations of the operations in FIG. 2 may also be performed in this embodiment of the present application. In addition, the steps in FIG. 2 may be performed in an order different from that presented in FIG. 2, and it is possible that not all operations in FIG. 2 need to be performed.

As shown in FIG. 2, the method 200 includes the following steps:

S210. A control node determines routing entry information of a service function forwarding node in a service function path SFP in the SFC.

S220. The control node sends the routing entry information to the service function forwarding node.

The control node may pre-configure at least one SFP based on a distribution status of network nodes in the SFC, to match packets that have different traffic. In a same SFC, different SFPs can be distinguished by service path identifiers SPIs. In other words, each SPI corresponds to one SFP. In a same SFP, a location of each service function forwarding node in the SFP may be indicated by using a service index (SI), where the SI performs an SI-1 operation every time a packet passes through one service function node.

Herein, it should be noted that one service function forwarding node may simultaneously belong to at least one SFP. Because the SPIs corresponding to the SFPs are different, the service function forwarding node may also correspondingly have different SPIs to distinguish different SFPs. In other words, a specific SFP and a location of a service function forwarding node in the SFP can be jointly indicated by the SPI and the SI.

In this embodiment of the present application, the SPI and the SI may be collectively referred to as route prefix information. The routing entry information records a mapping relationship between route prefix information and next hop information, the route prefix information may indicate a specific SFP, and determines a location, in the specific SFP, of a service function forwarding node in which a packet is currently located, and the next hop information indicates an address of a next hop node of the service function forwarding node. In other words, when a packet enters a service function forwarding node, the route prefix information may be used as a route to find an address of a corresponding next hop node, thereby forwarding the packet to the next hop node. It should be noted that the next hop node described herein may be an SFC node or a routing and switching device in a physical network. This is related to a node to which the service function forwarding node is directly connected. When the service function forwarding node (for example, the SFF 1 shown in FIG. 1) is directly connected to a service function node (for example, the SF 2 shown in FIG. 1) or a service function forwarding node (for example, the SFF 2 shown in FIG. 1), the next hop node of the service function forwarding node is an SFC node (for example, the service function node or the service function forwarding node). When the service function forwarding node (for example, the SFF 1 shown in FIG. 1) is directly connected to a routing and switching device (for example, the router shown in FIG. 1) in a physical network, the next hop node of the service function forwarding node is a routing and switching device.

For example, the at least one SFP may include a first SFP, and the first SFP may include the service function forwarding node. As shown in FIG. 1, it is assumed that SC→SFF 1→SF 1→SFF 1→SF 2→SFF 1→SFF 2→PS shown in FIG. 1 is the first SFP, and the SC and the SFF 1 are deployed on one device in a combined manner, then the SC or the SFF 1 is an ingress node (or a head node).

After determining the first SFP, the control node may send corresponding routing entry information to each node. The control node determines first routing entry information of a first service function forwarding node in the first SFP, and sends the first routing entry information to the first service function forwarding node.

It should be noted that routing entry information of each service function forwarding node in the SFC is stored in the control node, and each piece of routing entry information may correspond to one SFP. In the service function forwarding node included in each SFP, one SFP may correspond to one or more pieces of routing entry information. All pieces of routing entry information of the service function forwarding nodes form a routing table. In other words, the routing entry information may be understood as a subset of the routing table.

It should also be noted that in this embodiment of the present application, the SFP pre-configured by the control node is unrelated to characteristic information of traffic carried by the packet. The SFP may be understood as one or more paths that are used to transmit packets and that are pre-configured in the SFC. When entering a service function forwarding node in the SFP, a packet may enter a next node of this path by using a route of the service function forwarding node.

It should also be noted that the control node may pre-store routing entry information of each service function forwarding node in each SFP into a locally stored routing information base (RIB) based on the pre-configured SFP. In other words, the control node may obtain routing entry information of any service function forwarding node of any SFP in the SFC. To differ from a routing table that is stored in a service function forwarding node described in the following, a routing table stored in the control node is referred to as an SFC routing table, and a routing table stored in each service function forwarding node is determined based on the SFC routing table. The control node sends routing entry information to each service function forwarding node based on the SFC routing table, and each service function forwarding node updates the locally stored routing table based on the received routing entry information.

For ease of understanding and description, by using a specific process of forwarding a packet as an example, the following describes in detail the routing entry information delivered by the control node to the service function forwarding node with reference to FIG. 1 and Table 1.

It is assumed that a packet (referred to as a first packet for ease of description) that enters the SFC is directed to the first SFP, namely, SC→SFF 1→SF 1→SFF 1→SF 2→SFF 1→SFF 2→PS shown in FIG. 1. The SC and the SFF 1 may be deployed as the SFF 1 in a combined manner, and the PS and the SFF 2 may be deployed as the SFF 2 in a combined manner. For ease of description, descriptions on the SC and the PS are omitted below.

For example, a SPI corresponding to the first SFP may be 10, and an SI of an ingress node (namely, the SFF 1) may be 255. To be specific, route prefix information of the SFF 1 may be as follows: SPI=10 and SI=255. Routing entry information of the SFF 1 in the first SFP may be shown in Table 1.

TABLE 1

| SPI | SI | Next hop information |
|-----|-----|----------------------|
| 10  | 255 | 10.1.1.1/31          |
| 10  | 254 | 10.1.1.3/31          |
| 10  | 253 | 2.2.2.2/32           |

With reference to FIG. 1 and Table 1, it can be learned that in the first SFP, after the first packet enters the SFF 1, the route prefix information SPI=10 and SI=255 points to next hop information 10.1.1.1/31. To be specific, the next hop points to the SF 1, and the first packet is forwarded to the SF 1 by the SFF 1. After being processed by a service function of the SF 1, the first packet is returned to the SFF 1, and an SI-1 operation is performed. In this case, route prefix information of the SFF 1 is SPI=10 and SI=254, and points to next hop information 10.1.1.3/31. To be specific, the next hop points to the SF 2, and the first packet is forwarded to the SF 2 by the SFF 1. After being processed by a service function of the SF 2, the first packet is returned to the SFF 1 again, and an SI-1 operation is performed. In this case, route prefix information of the SFF 1 is SPI=10 and SI=253, and points to next hop information 2.2.2.2/32. To be specific, the next hop points to the SFF 2. Therefore, the first packet is forwarded to the next service function forwarding node SFF 2 by the SFF 1.

It should be noted that the route prefix information of the SFF 1 and the corresponding next hop information that are listed in Table 1 indicate a connection relationship between SFC nodes, and are forwarding entry information shown as an example when a control granularity is an SFC node, which should impose no limitation to the present application. Using FIG. 1 as an example, in an actual first packet forwarding process, the next hop information corresponding to the route prefix information: SPI=10 and SI=255, of the SFF 1 may be an address of the router 11, or may be an address of the router 21, or may be an address of the router 31. In other words, the route prefix information: SPI=10 and SI=255, of the SFF 1 may correspond to three entries, each entry includes a correspondence between the route prefix information and an address of a routing and switching device (for example, the router 11, the router 21, or the router 31 shown in FIG. 1). After being directed to the router 11, the router 21, or the router 31, the first packet may be continuously forwarded based on the routing entry information of the router 11, the router 21, or the router 31 until the first packet is forwarded to the SF 1.

Herein, for ease of description, an address of the SF 1 is denoted as the next hop information corresponding to the route prefix information: SPI=10 and SI=255, of the SFF 1, which should impose no limitation to the present application. Likewise, an address of the SF 2 is denoted as next hop information corresponding to the route prefix information: SPI=10 and SI=254, of the SFF 1, and an address of the SFF 2 is denoted as next hop information corresponding to the route prefix information: SPI=10 and SI=253, of the SFF 1.

In this embodiment of the present application, the SFF 1 corresponds to three pieces of route prefix information in the first SFP, and the three pieces of route prefix information have a same SPI (that is, correspond to a same SFP), but have different SIs, because every time the first packet passes through the SFF 1, a location of the SFF 1 in the first SFP varies. Next hop information corresponding to the pieces of route prefix information is also different. To be specific, next hop nodes to which the packet is directed by the pieces of route prefix information are also different. Mapping relationships between the three pieces of route prefix information and the three pieces of next hop information form routing entry information of the SFF 1 in the first SFP.

After determining the first SFP, the control node may send the routing entry information of the SFF 1 to the SFF 1, so that the SFF 1 forwards a packet based on the routing entry information.

It should be understood that the routing entry information shown in Table 1 is merely described as an example, which should impose no limitation to the present application. The routing entry information delivered by the control node to the service function forwarding node includes the SPI, the SI, and the next hop information that are described in Table 1, but Table 1 is not necessarily a form of expression of the routing entry information, or the routing entry information may be delivered to the service function forwarding node by using Table 1 or another form different from Table 1.

It should also be understood that the first SFP shown in FIG. 1 is merely described as an example, which should impose no limitation to the present application. For example, a service function node may be connected to the SFF 2, or a service function forwarding node may be connected after the SFF 2. This is not particularly limited in the present application. When the service function node or the service function forwarding node is connected to the SFF 2, the control node may also send routing entry information of the SFF 2 to the SFF 2, so that the SFF 2 forwards a packet based on the routing entry information.

It should also be understood that the control node may also determine a second SFP in the SFC, and the second SFP may also include the foregoing service function forwarding node. Therefore, after determining the second SFP, the control node may also send corresponding routing entry information to each node (including the service function forwarding node) in the second SFP.

It should also be understood that the foregoing describes in detail the routing entry information in combination with the first packet forwarding process, but should impose no limitation to the routing entry information. The service function forwarding node may forward the packet based on the routing entry information of the first SFP, or may forward the packet based on the routing entry information of the second SFP. In other words, routing entry information of each SFP does not change due to a path that the packet actually passes. Instead, an ingress node may select, based on attribute information of the packet, an SFP that matches the ingress node.

S230. The service function forwarding node stores the routing entry information into a routing table of the service function forwarding node.

After receiving the routing entry information delivered by the control node, the service function forwarding node stores the routing entry information into a locally stored routing table. In other words, the routing table stores at least one piece of routing entry information, and the at least one piece of routing entry information may include routing entry information of at least one SFP.

For example, the service function forwarding node is connected to both the first SFP and the second SFP, and corresponding SPIs are a SPI 1 and a SPI 2 respectively; at least one piece of routing entry information of the first SFP is stored in the first service function forwarding node, and a SPI in corresponding route prefix information is the SPI 1; and at least one piece of routing entry information of the second SFP is also stored in the first service function forwarding node, and a SPI in corresponding route prefix information is the SPI 2.

Optionally, the method 200 further includes the following step:

S240. The service function forwarding node generates a forwarding table based on the routing table, and forwards a packet based on the forwarding table.

The service function node can calculate an optimal path from the locally stored routing table based on a current network status, generate the forwarding table, and forward the packet based on the forwarding table. As an example instead of a limitation, the forwarding table may be a FIB table.

In other words, the service function forwarding node can store routing entry information of at least one SFP, but does not generate the forwarding table for routing entry information of each SFP. The forwarding table is generated when one SFP is determined as an optimal path. Optionally, the forwarding table generated by the service function forwarding node may be stored locally, so as to be used again when a packet is forwarded based on a same SFP. The service function forwarding node has a control plane and a forwarding plane. The control node sends the routing entry information to the control plane of the service function forwarding node. The service function forwarding node stores the routing entry information into the control plane, and calculates the optimal path based on attribute information (for example, 5-tuple information) of a packet that enters the SFC, then generates the forwarding table based on information about the optimal path, and delivers the forwarding table to the forwarding plane, so that the forwarding plane forwards the packet based on the forwarding table.

It should be noted that routing protocols such as BGP are protocol specifications defined by the IETF bit by bit. These protocols have strict standards and good interoperability, and can be directly interconnected to a plurality of vendors. Compared with an OpenFlow flow table, the routing table and the forwarding table (for example, the FIB table) are mature encoding formats at present, and interconnection between the control node and the service function forwarding node is also relatively easy.

Therefore, according to the method for forwarding a packet in the SFC in this embodiment of the present application, the control node directly delivers the routing entry information to the service function forwarding node, the service function forwarding node generates the forwarding table, and interaction between the control node and the service function forwarding node is standardized by using a mature protocol, to implement smooth interconnection between the control node and the service function forwarding node. In addition, the service function forwarding node can determine the optimal path based on the current network status, and generates the forwarding table. In addition, the SPI and the SI are used as routes in a conventional routing and switching device to direct the packet. To be specific, a routing policy that exists in an existing SDN device is used to flexibly process the routes that exist in a "SPI and SI" manner. Compared with an existing conventional routing and switching device, the routing and switching device in the present application is more convenient and flexible.

Optionally, the sending, by the control node, the routing entry information to the service function forwarding node includes:

generating, by the control node, a BGP update packet, where the BGP update packet carries the routing entry information; and sending, by the control node, the BGP update packet to the service function forwarding node.

In this embodiment of the present application, the routing entry information is carried by using a BGP packet. As an example instead of a limitation, the BGP packet may be the BGP update packet.

Optionally, the generating, by the control node, a BGP update packet, where the BGP update packet carries the routing entry information includes:

generating, by the control node, the BGP update packet, where the BGP update packet includes a multiprotocol reachable network layer reachability information (MP_REACH_NLRI) attribute field, and the MP_REACH_NLRI attribute field includes a subsequent address family identifier (SAFI) field, an NLRI field, and a next hop information field. The SAFI field indicates that the MP_REACH_NLRI attribute field is encapsulated based on an encapsulation format supported by an SFC synchronization address family, and the NLRI field includes a type-length-value (TLV) field. A type T field of the TLV field indicates that a type of the TLV field is an SFC routing entry synchronization type, and a value V field of the TLV field carries the SPI and the SI. The next hop information field carries the next hop information.

In this embodiment of the present application, the BGP SFC Synchronization address family can be newly added to the existing BGP address family, and the routing entry information is encapsulated based on an encapsulation format supported by the newly added BGP SFC Synchronization address family. An encapsulation format of MP_REACH_NLRI of the newly added BGP SFC Synchronization address family is shown in FIG. 3.

Figure 3:
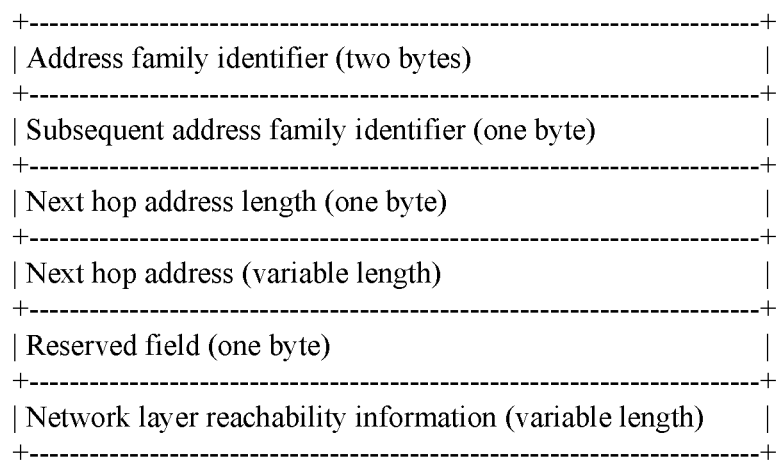
FIG. 3 is a schematic diagram of a multiprotocol reachable network layer reachability information (MP_REACH_NLRI) attribute field encapsulated based on an encapsulation format supported by a Border Gateway Protocol (BGP) SFC synchronization address family according to an embodiment of the present application.

FIG. 3 is a schematic diagram of an MP_REACH_NLRI attribute field encapsulated based on an encapsulation format supported by a BGP SFC Synchronization address family according to an embodiment of the present application. The MP_REACH_NLRI may be understood as multiprotocol extension attribute information of network layer reachability information (NLRI), and includes three parts: an address family information field, a next hop information field, and a network layer reachability information (NLRI) field.

The address family information field includes an address family identifier field (two bytes) and a subsequent address family identifier field (one byte). The address family identifier (AFI) identifies a network layer protocol. For example, an AFI value of 1 indicates IPv4, and an AFI value of 2 indicates IPv6. The subsequent address family identifier (SAFI) identifies a type of a subsequent address family. For example, a SAFI value of 1 indicates unicast, a SAFI value of 2 indicates multicast, and a SAFI value of 128 indicates a virtual private network (VPN). An AFI value of 1 and a SAFI value of 1 indicates that an IPv4 unicast route is carried in the NLRI field; an AFI value of 1 and a SAFI value of 128 indicates that a BGP-VPNv4 route is carried in the NLRI field; or an AFI value of 1 and a SAFI value of 4 indicates that a BGP label route is carried in the NLRI field.

In this embodiment of the present application, the BGP SFC Synchronization address family may be understood as a subsequent address family extended from an IPv4 or IPv6 address family in the existing BGP protocol. In other words, the AFI value may be 1 or 2. The SAFI value may be determined based on a standard formulated by the Internet Engineering Task Force (IETF).

The next hop information field includes a next hop address length field (one byte) and a next hop address field (variable length). The next hop address length field is used to identify a length of the next hop address field, and the length of the next hop address field is determined by the length indicated by the next hop address length field.

A one-byte reserved field exists between the next hop information field and the NLRI part.

Figure 4:
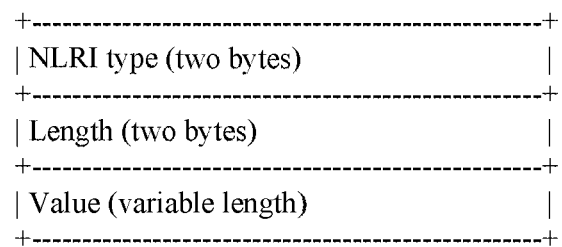
FIG. 4 is a schematic diagram of a type-length-value (TLV) field in an NLRI field according to an embodiment of the present application.

The NLRI part includes an NLRI field, and the NLRI field further includes a TLV field (variable length). FIG. 4 is a schematic diagram of a TLV field in an NLRI field according to an embodiment of the present application. A type T field indicates that a type of the TLV field is an SFC routing entry synchronization type, a length L field indicates a length of a V field, and a value V field carries a SPI and an SI. In this embodiment of the present application, a value 1 of the T field may indicate an SFC forwarding entry synchronization (Forwarding Entry Synchronization) type; a value of the L field is 32 bits, namely, 4 bytes; and the V field includes the SPI that is three bytes and the SI that is one byte.

It should be understood that the Type 1 type enumerated herein is the SFC forwarding entry synchronization type, which is merely described as an example, and should impose no limitation to the present application. This embodiment of the present application does not exclude a possibility of indicating another type by using the Type 1 or indicating the SFC forwarding entry synchronization type by using another manner. In addition, a quantity of types of the NLRI Type is not particularly limited in this embodiment of the present application either.

Further, the routing entry information further includes route attribute information, and the route attribute information includes at least one of the following traffic distribution parameter types: weight, cost, and bandwidth.

In this embodiment of the present application, when receiving the routing entry information, the service function forwarding node distributes, based on the route attribute information carried in the routing entry information, forwarding traffic to a plurality of channels that reach a same target node. Therefore, the traffic may be distributed more properly and flexibly in the SFC.

Optionally, the routing entry information further includes route attribute information, and the route attribute information includes at least one of the following traffic distribution parameter types: weight, cost, and bandwidth.

The BGP update packet further includes a BGP SFC attribute field, the BGP SFC Attribute field includes at least one sub-TLV field, and each traffic distribution parameter type corresponds to one of the at least one sub-TLV field. Each sub-TLV field includes a T field (two bytes), an L field (two bytes), and a V field (determined by a value of the L field).

Figure 5:
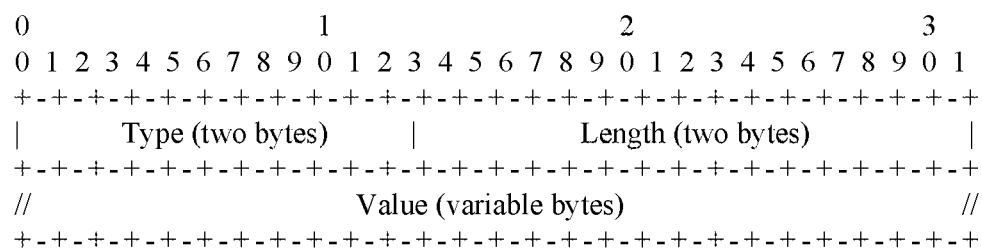
FIG. 5 is a schematic diagram of a sub-TLV field in a BGP SFC attribute (Attribute) field according to an embodiment of the present application.

FIG. 5 is a schematic diagram of a sub-TLV field in a BGP SFC Attribute field according to an embodiment of the present application. A length of a type T field is two bytes, a length of a length L field is two bytes, and a length of a value V field is determined by the length L field. Each sub-TLV is used to indicate a traffic distribution parameter. The T field indicates a traffic distribution parameter type. For example, a value 1 of the T field may indicate weight; a value 2 of the T field may indicate cost; or a value 3 of the T field may indicate bandwidth.

A piece of BGP SFC attribute information may be newly defined in a BGP update packet, and route attribute information is carried by at least one sub TLV. As an example instead of a limitation, the route attribute information includes at least one of the following traffic distribution parameter types: weight, cost (, and bandwidth. The T field indicates a traffic distribution parameter type. For example, a value 1 of the T field may indicate weight; a value 2 of the T field may indicate cost; or a value 3 of the T field may indicate bandwidth.

For example, when a value of a Sub-Type in a BGP SFC Attribute field of routing entry information delivered by a control node to a service function forwarding node is 3, it indicates that the traffic distribution parameter type is the bandwidth, that is, it indicates a bandwidth value that can be used by an SFP indicated by the routing entry information. When a value of a Sub-Value is 200 M, it indicates that a bandwidth value that can be used by an SFP indicated by the routing entry information is 200 M. When traffic exceeds 200 M, the traffic that exceeds 200 M is not allowed to be forwarded by using the SFP indicated by the routing entry information.

For another example, when a value of a Sub-Type in a BGP SFC Attribute field of routing entry information delivered by a control node to a service function forwarding node is 2, it indicates that the traffic distribution parameter type is the cost, that is, it indicates that when a plurality of entries are available, a primary entry may be preferentially selected based on the cost, and if necessary, a secondary entry may also be selected. In other words, when the traffic distribution parameter type is the cost, the control node delivers, to the service function forwarding node, at least two pieces of routing entry information that have a same SPI value and SI value.

Herein, it should be noted that as described above (refer to FIG. 1), when a control granularity is a routing and switching device connected between SFC nodes, a plurality of pieces of routing entry information that are in the service function forwarding node, that are delivered by the control node, and that have a same SPI value and SI value may respectively correspond to a plurality of different pieces of next hop information, may respectively correspond to different next hop routing and switching devices, or may correspond to different channels, and finally reach a same SFC node (namely, a target node).

For example, Entry 1 is as follows:

SPI=10, SI=255, Next-Hop=11.1.1.1
BGP SFC Attribute:
...
Sub-Type 2, Cost=5
...

Entry 2 is as follows:

SPI=10, SI=255, Next-Hop=21.1.1.1
BGP SFC Attribute:
...
Sub-Type 2, Cost=10
...

It can be learned that Entry 1 and Entry 2 have the same SPI value and SI value, but correspond to different next hop information. For example, referring to FIG. 1, Entry 1 directs a packet to the router 11 by using the SFF 1, and Entry 2 directs a packet to the router 21 by using the SFF 1. In other words, there are two channels between the service function forwarding node and the target node. In other words, two SFC nodes may be connected by using a plurality of routing and switching devices, and two channels formed by connecting the plurality of routing and switching devices are between the two SFC nodes. An cost value of one channel is 5, and an cost value of the other channel is 10. When receiving this routing entry information that carries the cost values, the service function forwarding node may use the channel having a smaller cost value to forward the packet. In other words, a smaller cost value may indicate a higher priority. Alternatively, the channel with a smaller cost value may be used as a primary channel, and the channel with a larger cost value may be used as a secondary channel.

For another example, when a value of a Sub-Type in a BGP SFC Attribute field of routing entry information delivered by a control node to a service function forwarding node is 1, it indicates that the traffic distribution parameter type is the weight, that is, it indicates that when a plurality of entries perform load sharing, a proportion of traffic carried by each entry may be calculated based on the weight. In other words, when the traffic distribution parameter type is the weight, the control node delivers, to the service function forwarding node, at least two pieces of routing entry information that have a same SPI value and SI value. For example, Entry 3 is as follows:

---
SPI=10, SI=255, Next-Hop=11.1.1.1
BGP SFC Attribute:
...
Sub-Type 1, Weight=20
...
---

Entry 4 is as follows:

---
SPI=10, SI=255, Next-Hop=21.1.1.1
BGP SFC Attribute:
...
Sub-Type 1, Weight=30
...
---

Entry 5 is as follows:

---
SPI=10, SI=255, Next-Hop=31.1.1.1
BGP SFC Attribute:
...
Sub-Type 1, Weight=50
...
---

It can be learned that Entry 3, Entry 4, and Entry 5 have the same SPI value and SI value, but correspond to different next hop information. For example, referring to FIG. 1, Entry 3 directs a packet to the router 11 by using the SFF 1, Entry 4 directs a packet to the router 21 by using the SFF 1, and Entry 5 directs a packet to the router 31 by using the SFF 1. In other words, there are three channels between the service function forwarding node and the target node. In other words, two SFC nodes may be connected by using a plurality of routing and switching devices, and two channels formed by connecting the plurality of routing and switching devices are between the two SFC nodes.

When receiving this routing entry information that carries weight values, the service function forwarding node can load and share traffic based on a weight value of each channel. For example, in this example, when the channels corresponding to the three entries are used to share the traffic, a channel corresponding to Entry 3 shares 20% (20/(20+30+50)) of the traffic, a channel corresponding to Entry 4 shares 30% (30/(20+30+50)) of the traffic, and a channel corresponding to Entry 5 shares 50% (50/(20+30+50)) of the traffic.

For another example, in the foregoing example, when Entry 5 is deleted, channels corresponding to the two remaining entries are used to share traffic forwarding, the channel corresponding to Entry 3 shares 40% (20/(20+30)) of the traffic, and the channel corresponding to Entry 4 shares 60% (30/(20+30)) of the traffic. When there is only one available entry, the weight value does not work.

It should be understood that the traffic distribution parameter types that are enumerated above are merely described as examples, which should impose no limitation to the present application. A field for carrying the route attribute information is not limited to the foregoing BGP SFC Attribute field, or another existing or newly added field may be used for carrying the route attribute information. This is not particularly limited in the present application.

It should be understood that the above-enumerated method for distributing the traffic based on the traffic distribution parameters is merely described as an example, which should impose no limitation to the present application. For example, in this embodiment of the present application, the control node may add a plurality of traffic distribution parameter types to the routing entry information, and the service function forwarding node may simultaneously distribute traffic based on the plurality of traffic distribution parameter types.

It should also be understood that the above-enumerated method for carrying the routing entry information by using the BGP update packet and the fields in the packet is merely described as an example, which should impose no limitation to the present application. The present application does not exclude a possibility of carrying the foregoing routing entry information by using another existing or newly added field.

Optionally, the storing, by the service function forwarding node, the routing entry information into a routing table of the service function forwarding node in S230 includes:

searching, by the service function forwarding node based on the SPI and the SI, the routing table of the service function forwarding node for target routing entry information having the same SPI and SI; and updating, by the service function forwarding node, the target routing entry information based on the routing entry information when the target routing entry information is found; or storing, by the service function forwarding node, the routing entry information when the target routing entry information is not found.

The service function forwarding node may use the SPI value, the SI value, and the next hop information that are in the routing entry information as key values for searching, and search a locally stored routing table for the routing entry information that has the same SPI value, SI value, and next hop information (for ease of distinction and description, the routing entry information locally found by the service function forwarding node is recorded as the target routing entry information). The service function forwarding node may search for an entry of a Type 1 type (namely, an SFC routing entry synchronization type) in a routing table of a BGP SFC Synchronization address family.

If the service function forwarding node finds the target routing entry information in the locally stored routing table, the service function forwarding node updates the target routing entry information based on the route attribute information carried by the received routing entry information. If the service function forwarding node does not find the target routing entry information in the locally stored routing table, the service function forwarding node directly stores the received routing entry information into the locally stored routing table, or newly creates an entry of the Type 1 type and stores the routing entry information into the newly created entry.

Therefore, according to the method for forwarding a packet in the SFC in this embodiment of the present application, the route attribute information is added in the routing entry information, so that the service function forwarding node can distribute traffic more properly and flexibly based on traffic distribution parameters.

It should be understood that the foregoing method for forwarding a packet in the SFC is a method for standardizing interaction between a controller and a routing and switching device, which is provided for a transition phase in which a conventional routing and switching device and an SDN routing and switching device coexist in an existing SDN. With development of the SDN, the SDN routing and switching device is gradually popular. When the SDN routing and switching device becomes a widely used routing and switching device, a routing entry information synchronization manner in the existing transition phase may be further improved, so that a control plane is separated from a forwarding plane, the controller delivers forwarding entry information, and a routing and forwarding device does not need to calculate a forwarding table by itself.

Therefore, the present application provides another method for forwarding a packet in the SFC, so that the control plane can be separated from the forwarding plane.

Figure 6:
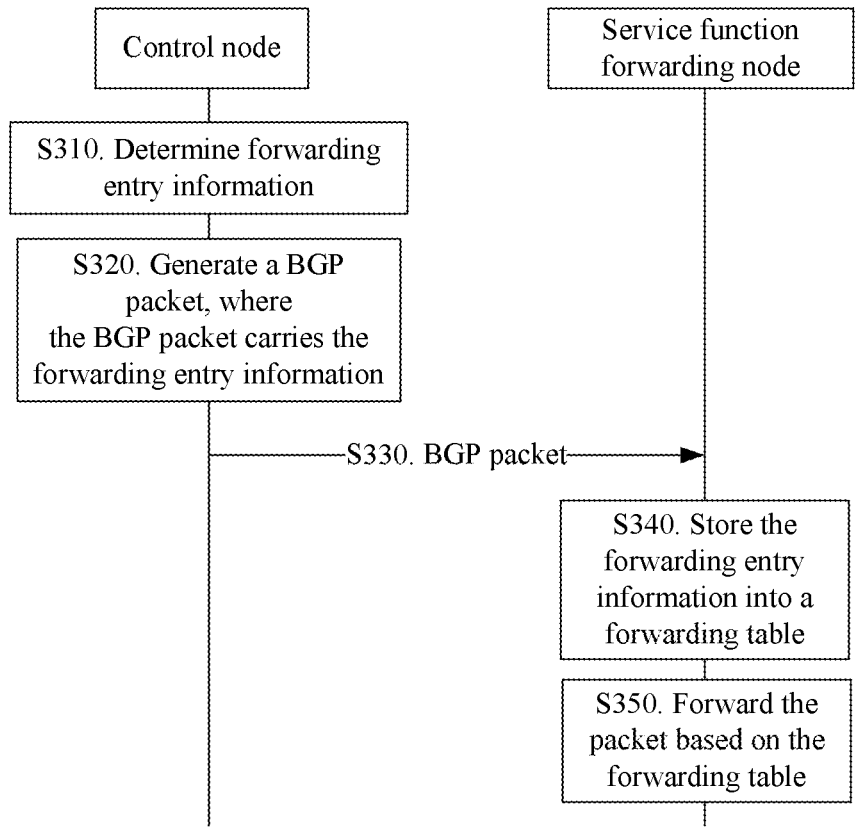
FIG. 6 is a schematic flowchart of a method for forwarding a packet in SFC according to another embodiment of the present application.

The following describes in detail a method for forwarding a packet in SFC according to another embodiment of the present application with reference to FIG. 6.

FIG. 6 is a schematic flowchart of a method 300 for forwarding a packet in SFC according to another embodiment of the present application. It should be understood that FIG. 6 shows detailed communication steps or operations of the method for forwarding a packet in the SFC, but these steps or operations are merely examples, and other operations or variations of the operations in FIG. 6 may also be performed in this embodiment of the present application. In addition, the steps in FIG. 6 may be performed in an order different from that presented in FIG. 6, and it is possible that not all operations in FIG. 6 need to be performed.

As shown in FIG. 6, the method 300 includes the following steps:

S310. A control node determines forwarding entry information of a service function forwarding node in a service function path SFP in the SFC.

The forwarding entry information records a mapping relationship between forwarding prefix information and next hop information. The forwarding prefix information includes a service path identifier SPI and a service index SI, the SPI is used to identify the SFP, and the SI is used to identify a location of the service function forwarding node in the SFP. The next hop information is used to indicate a next hop node of the service function forwarding node in the SFP.

S320. The control node generates a Border Gateway Protocol (BGP) packet, where the BGP packet carries the forwarding entry information.

The control node may add the forwarding entry information to the BGP packet. A specific method for carrying the forwarding entry information by the BGP packet is similar to a specific method for carrying the routing entry information by the BGP update packet in the method 200. For brevity, details are not described herein again.

Optionally, that the control node generates a Border Gateway Protocol (BGP) packet, where the BGP packet carries the forwarding entry information in S320 includes:

generating, by the control node, the BGP packet, where the BGP packet includes a multiprotocol reachable network layer reachability information (MP_REACH_NLRI) attribute field that is encapsulated based on an encapsulation format supported by an SFC synchronization address family, the MP_REACH_NLRI attribute field includes an NLRI field and a next hop information field, the NLRI field includes a type-length-value (TLV) field, a type T field of the TLV field indicates that a type of the TLV field is an SFC forwarding entry synchronization type, a value V field of the TLV field carries the SPI and the SI, and the next hop information field carries the next hop information.

Optionally, the forwarding entry information further includes forwarding attribute information, and the forwarding attribute information includes at least one of the following traffic distribution parameter types: weight, cost, and bandwidth.

The BGP packet further includes a BGP SFC attribute field, the BGP SFC Attribute field includes at least one sub-TLV field, and each traffic distribution parameter type corresponds to one of the at least one sub-TLV field. Each sub-TLV field includes a T field, a length L field, and a V field, where the T field indicates any one of the traffic distribution parameter types, and the V field indicates a parameter used to distribute, based on a corresponding traffic distribution parameter type, traffic carried by the packet. A specific carrying manner is similar to that in the foregoing embodiment, and details are not described herein again.

S330. The control node sends the BGP packet to the service function forwarding node, where the forwarding entry information carried by the BGP packet is used to instruct the service function forwarding node to forward a packet.

S340. The service function forwarding node stores the forwarding entry information into a forwarding table of the service function forwarding node.

The service function forwarding node stores the forwarding entry information, so as to directly forward, when a packet having same traffic characteristic information is received subsequently, the packet based on the forwarding entry information.

Optionally, the method 300 further includes the following step:

S350. The service function forwarding node forwards the packet based on the forwarding entry information.

Optionally, in this embodiment of the present application, the BGP packet may be a BGP update packet.

It should be understood that in this embodiment of the present application, the service function forwarding node may store the forwarding table in a forwarding plane. A specific method for storing the forwarding entry information by the service function forwarding node is similar to a specific method for storing the routing entry information by the service function forwarding node described above. A difference is only that the routing entry information may be stored in a control plane of the service function forwarding node, and the forwarding entry information may be stored in the forwarding plane of the service function forwarding node. For brevity, detailed description of the specific method for storing the forwarding entry information by the service function forwarding node is omitted herein.

It should be noted that, different from the method 200, in this embodiment of the present application, the control node may directly determine forwarding entry information of each service function forwarding node based on a routing table, encapsulate the forwarding entry information by using the BGP packet, and deliver the forwarding entry information to the service function forwarding node. The service function forwarding node may not store the routing table but only store the forwarding table. In other words, the service function forwarding node may not perform calculation but only forward the packet. Therefore, the control plane is separated from the forwarding plane, which helps management.

It should also be noted that content of information indicated by the routing entry information in the method 200 is similar to content of information indicated by the forwarding entry information in the method 300, and both may be used to indicate a SPI, an SI, and next hop information of a service function forwarding node, or a SPI, an SI, next hop information, and route attribute information of a service function node. A difference is that in the method 200, the routing entry information may be stored in the routing table of the control plane of the service function forwarding node, and the service function forwarding node needs to calculate by itself to generate an optimal path, generates the forwarding table based on the optimal path, and performs traffic matching and packet forwarding based on the forwarding table; and in the method 300, the forwarding entry information may be directly stored in the forwarding plane of the service function forwarding node, and is directly used to direct the service function forwarding node to perform traffic matching and packet forwarding.

It should be understood that the "routing entry information" and the "forwarding entry information" are merely named separately for distinguishing the foregoing two methods, which should impose no limitation to the present application. The present application should not be limited thereto. For example, in the method 300, the forwarding entry information may also be referred to as the routing entry information, or in the method 200, the routing entry information may also be referred to as the forwarding entry information.

Likewise, the "route attribute information" and the "forwarding attribute information" as well as the "route prefix information" and the "forwarding prefix information", that are described above, are also named separately for distinguishing the foregoing two methods, which should impose no limitation to the present application. The present application should not be limited thereto.

It should also be understood that the above-enumerated method for carrying the forwarding entry information by using the BGP packet and the fields in the packet is merely described as an example, which should impose no limitation to the present application. The present application does not exclude a possibility of carrying the foregoing forwarding entry information by using another existing or newly added field.

Therefore, according to the method for forwarding a packet in the SFC in this embodiment of the present application, the control node directly delivers the forwarding entry information to the service function forwarding node by using the BGP packet, and the service function forwarding node can directly forward the packet based on the forwarding entry information. Interaction between the control node and the service function forwarding node is standardized by using a mature protocol, to implement smooth interconnection between the control node and the service function forwarding node. In addition, the control plane is separated from the forwarding plane, so that control planes of forwarding nodes are centralized on the controller, which helps to implement a centralized service deployment strategy and implement a centralized management and maintenance strategy.

The foregoing describes in detail a method for forwarding a packet in the SFC according to an embodiment of the present application with reference to FIG. 2 to FIG. 6. The following describes in detail an apparatus and a system for forwarding a packet in SFC according to an embodiment of the present application with reference to FIG. 7 to FIG. 16.

Figure 7:
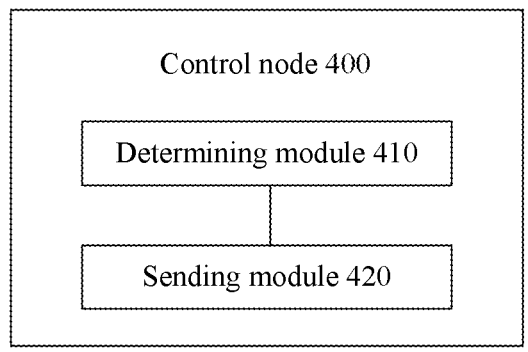
FIG. 7 is a schematic block diagram of a control node according to an embodiment of the present application.

FIG. 7 is a schematic block diagram of a control node 400 according to an embodiment of the present application. As shown in FIG. 7, the control node 400 includes a determining module 410 and a sending module 420.

The determining module 410 is configured to determine routing entry information of a service function forwarding node in a service function path SFP in service function chaining SFC, where the routing entry information records a mapping relationship between route prefix information and next hop information. The route prefix information includes a service path identifier SPI and a service index SI, the SPI is used to identify the SFP, and the SI is used to identify a location of the service function forwarding node in the SFP. The next hop information is used to indicate a next hop node of the service function forwarding node.

The sending module 420 is configured to send the routing entry information to the service function forwarding node, where the routing entry information is used by the service function forwarding node to generate a forwarding table, and the forwarding table is used to instruct the service function forwarding node to forward a packet.

Optionally, the control node 400 further includes a generating module, configured to generate a Border Gateway Protocol BGP update packet, where the BGP update packet carries the routing entry information.

The sending module 420 is configured to send the BGP update packet to the service function forwarding node.

Optionally, the generating module is configured to generate the BGP update packet, where the BGP update packet includes a multiprotocol reachable network layer reachability information (MP_REACH_NLRI) attribute field, and the MP_REACH_NLRI attribute field includes a subsequent address family identifier (SAFI) field, an NLRI field, and a next hop information field. The SAFI field indicates that the MP_REACH_NLRI attribute field is encapsulated based on an encapsulation format supported by an SFC synchronization address family, and the NLRI field includes a type-length-value (TLV) field. A type T field of the TLV field indicates that a type of the TLV field is an SFC routing entry synchronization type, and a value V field of the TLV field carries the SPI and the SI. The next hop information field carries the next hop information.

Optionally, the routing entry information further includes route attribute information, and the route attribute information includes at least one of the following traffic distribution parameter types: weight, cost, and bandwidth.

The BGP update packet further includes a BGP SFC attribute field, the BGP SFC Attribute field includes at least one sub-TLV field, and each traffic distribution parameter type corresponds to one of the at least one sub-TLV field. Each sub-TLV field includes a T field, an L field, and a V field, where the T field indicates any one of the traffic distribution parameter types, and the V field indicates a parameter used to distribute, based on a corresponding traffic distribution parameter type, traffic carried by the packet.

The control node 400 according to this embodiment of the present application may correspond to a control node in a method for forwarding a packet in the SFC according to an embodiment of the present application. In addition, the modules in the control node 400 and the foregoing other operations and/or functions are respectively used to implement corresponding procedures of the method 200 in FIG. 2. For brevity, details are not described herein again.

Therefore, based on the control node in this embodiment of the present application, the routing entry information is directly delivered to the service function forwarding node, the service function forwarding node generates the forwarding table, and interaction between the control node and the service function forwarding node is standardized by using a mature protocol, to implement smooth interconnection between the control node and the service function forwarding node.

Figure 8:
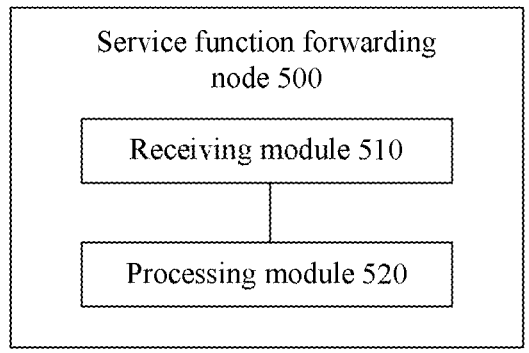
FIG. 8 is a schematic block diagram of a service function forwarding node according to an embodiment of the present application.

FIG. 8 is a schematic block diagram of a service function forwarding node 500 according to an embodiment of the present application. As shown in FIG. 8, the service function forwarding node 500 includes a receiving module 510 and a processing module 520.

The receiving module 510 is configured to receive routing entry information sent by a control node, where the routing entry information records a mapping relationship between route prefix information and next hop information. The route prefix information includes a service path identifier (SPI) and a service index (SI), the SPI is used to identify an SFP, and the SI is used to identify a location of the service function forwarding node in the SFP. The next hop information is used to indicate a next hop node of the service function forwarding node.

The processing module 520 is configured to store the routing entry information into a routing table of the service function forwarding node, so that the service function forwarding node generates a forwarding table based on the routing table, and forwards a packet based on the forwarding table.

Optionally, the receiving module 510 is configured to receive a Border Gateway Protocol BGP update packet sent by the control node, where the BGP update packet carries the routing entry information.

Optionally, the BGP update packet includes a multiprotocol reachable network layer reachability information (MP_REACH_NLRI) attribute field, and the MP_REACH_NLRI attribute field includes a subsequent address family identifier (SAFI) field, an NLRI field, and a next hop information field. The SAFI field indicates that the MP_REACH_NLRI attribute field is encapsulated based on an encapsulation format supported by an SFC synchronization address family, and the NLRI field includes a type-length-value (TLV) field. A type T field of the TLV field indicates that a type of the TLV field is an SFC routing entry synchronization type, and a value V field of the TLV field carries the SPI and the SI. The next hop information field carries the next hop information.

Optionally, the routing entry information further includes route attribute information, and the route attribute information includes at least one of the following traffic distribution parameter types: weight, cost, and bandwidth.

The BGP update packet further includes a BGP SFC attribute field, the BGP SFC Attribute field includes at least one sub-TLV field, and each traffic distribution parameter type corresponds to one of the at least one sub-TLV field. Each sub-TLV field includes a T field, an L field, and a V field, where the T field indicates any one of the traffic distribution parameter types, and the V field indicates a parameter used to distribute, based on a corresponding traffic distribution parameter type, traffic carried by the packet.

Optionally, the processing module 520 is configured to: search, based on the SPI and the SI, the routing table of the service function forwarding node for target routing entry information having the same SPI and SI; and update the target routing entry information based on the routing entry information when the target routing entry information is found; or store the routing entry information when the target routing entry information is not found.

The service function forwarding node 500 according to this embodiment of the present application may correspond to a service function forwarding node in a method for forwarding a packet in the SFC according to an embodiment of the present application. In addition, the modules in the service function forwarding node 500 and the foregoing other operations and/or functions are respectively used to implement corresponding procedures of the method 200 in FIG. 2. For brevity, details are not described herein again.

Therefore, based on the service function forwarding node in this embodiment of the present application, the routing entry information delivered by the control node is received, and the forwarding table is generated based on the routing entry information. Interaction between the control node and the service function forwarding node is standardized by using a mature protocol, to implement smooth interconnection between the control node and the service function forwarding node.

Figure 9:
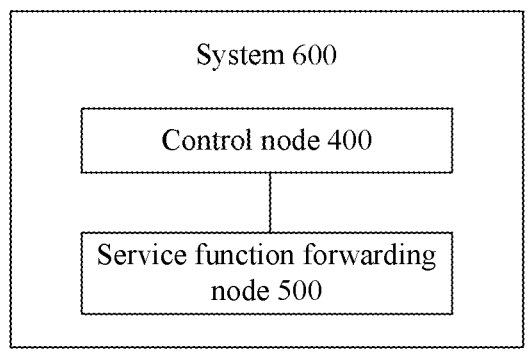
FIG. 9 is a schematic block diagram of a system for forwarding a packet in SFC according to an embodiment of the present application.

FIG. 9 is a schematic block diagram of a system 600 for forwarding a packet in SFC according to an embodiment of the present application. As shown in FIG. 9, the system 600 for forwarding a packet includes the control node 400 described in the foregoing embodiment and the service function forwarding node 500 described in the foregoing embodiment.

It should be understood that modules in the system 600 for forwarding a packet and other operations and/or functions are respectively used to implement corresponding procedures of the method 200 in FIG. 2. For brevity, details are not described herein again.

Therefore, based on the system for forwarding a packet in the SFC in this embodiment of the present application, the control node directly delivers routing entry information to the service function forwarding node, and the service function forwarding node generates a forwarding table based on the routing entry information. Interaction between the control node and the service function forwarding node is standardized by using a mature protocol, to implement smooth interconnection between the control node and the service function forwarding node.

Figure 10:
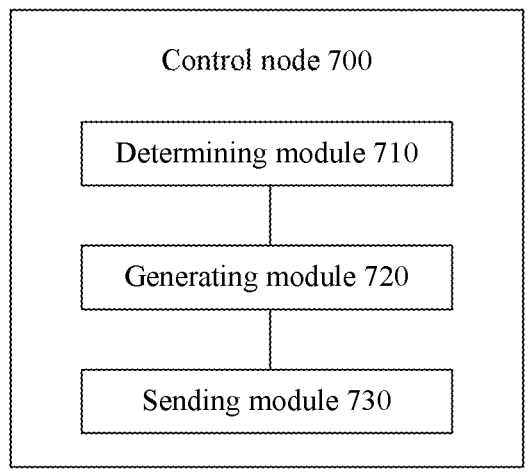
FIG. 10 is a schematic block diagram of a control node according to another embodiment of the present application.

FIG. 10 is a schematic block diagram of a control node 700 according to another embodiment of the present application. As shown in FIG. 10, the control node 700 includes a determining module 710, a generating module 720, and a sending module 730.

The determining module 710 is configured to determine forwarding entry information of a service function forwarding node in a service function path (SFP) in SFC, where the forwarding entry information records a mapping relationship between forwarding prefix information and next hop information. The forwarding prefix information includes a service path identifier (SPI) and a service index (SI), the SPI is used to identify the SFP, and the SI is used to identify a location of the service function forwarding node in the SFP. The next hop information is used to indicate a next hop node of the service function forwarding node.

The generating module 720 is configured to generate a Border Gateway Protocol (BGP) packet, where the BGP packet carries the forwarding entry information.

The sending module 730 is configured to send the BGP packet to the service function forwarding node, where the forwarding entry information carried by the BGP packet is used to instruct the service function forwarding node to forward a packet.

Optionally, the generating module 720 is configured to generate the BGP packet, where the BGP packet includes a multiprotocol reachable network layer reachability information (MP_REACH_NLRI) attribute field, and the MP_REACH_NLRI attribute field includes a subsequent address family identifier (SAFI) field, an NLRI field, and a next hop information field. The SAFI field indicates that the MP_REACH_NLRI attribute field is encapsulated based on an encapsulation format supported by an SFC synchronization address family, and the NLRI field includes a type-length-value (TLV) field. A type T field of the TLV field indicates that a type of the TLV field is an SFC forwarding entry synchronization type, and a value V field of the TLV field carries the SPI and the SI. The next hop information field carries the next hop information.

Optionally, the forwarding entry information includes forwarding attribute information, and the forwarding attribute information includes at least one of the following traffic distribution parameter types: weight, cost, and bandwidth.

The BGP packet includes a BGP SFC attribute field, the BGP SFC Attribute field includes at least one sub-TLV field, and each traffic distribution parameter type corresponds to one of the at least one sub-TLV field. Each sub-TLV field includes a T field, a length L field, and a V field, where the T field indicates any one of the traffic distribution parameter types, and the V field indicates a parameter used to distribute, based on a corresponding traffic distribution parameter type, traffic carried by the packet.

Optionally, the BGP packet is a BGP update packet.

The control node 700 according to this embodiment of the present application may correspond to a control node in a method for forwarding a packet in the SFC according to an embodiment of the present application. In addition, the modules in the control node 700 and the foregoing other operations and/or functions are respectively used to implement corresponding procedures of the method 300 in FIG. 6. For brevity, details are not described herein again.

Therefore, based on the control node in this embodiment of the present application, the forwarding entry information is directly delivered to the service function forwarding node by using the BGP packet, and the service function forwarding node can directly forward the packet based on the forwarding entry information. Interaction between the control node and the service function forwarding node is standardized by using a mature protocol, to implement smooth interconnection between the control node and the service function forwarding node. In addition, the control plane is separated from the forwarding plane, which helps management.

Figure 11:
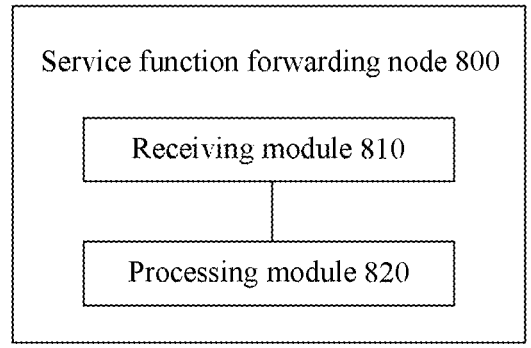
FIG. 11 is a schematic block diagram of a service function forwarding node according to another embodiment of the present application.

FIG. 11 is a schematic block diagram of a service function forwarding node 800 according to another embodiment of the present application. As shown in FIG. 11, the service function forwarding node 800 includes a receiving module 810 and a processing module 820.

The receiving module 810 is configured to receive a Border Gateway Protocol (BGP) packet sent by a control node, where the BGP packet carries forwarding entry information, and the forwarding entry information records a mapping relationship between SFC forwarding prefix information and next hop information. The SFC forwarding prefix information includes a service path identifier (SPI) and a service index (SI), the SPI is used to identify an SFP, and the SI is used to identify a location of the service function forwarding node in the SFP. The next hop information is used to indicate a next hop node of the service function forwarding node.

The processing module 820 is configured to store the forwarding entry information, so that the service function forwarding node 800 forwards a packet based on the forwarding entry information.

Optionally, the BGP packet includes a multiprotocol reachable network layer reachability information (MP_REACH_NLRI) attribute field, and the MP_REACH_NLRI attribute field includes a subsequent address family identifier (SAFI) field, an NLRI field, and a next hop information field. The SAFI field indicates that the MP_REACH_NLRI attribute field is encapsulated based on an encapsulation format supported by an SFC synchronization address family, and the NLRI field includes a type-length-value (TLV) field. A type T field of the TLV field indicates that a type of the TLV field is an SFC forwarding entry synchronization type, and a value V field of the TLV field carries the SPI and the SI. The next hop information field carries the next hop information.

Optionally, the forwarding entry information includes forwarding attribute information, and the forwarding attribute information includes at least one of the following traffic distribution parameter types: weight, cost, and bandwidth.

The BGP packet includes a BGP SFC attribute Attribute field, the BGP SFC Attribute field includes at least one sub-TLV field, and each traffic distribution parameter type corresponds to one of the at least one sub-TLV field. Each sub-TLV field includes a T field, a length L field, and a V field, where the T field indicates any one of the traffic distribution parameter types, and the V field indicates a parameter used to distribute, based on a corresponding traffic distribution parameter type, traffic carried by the packet.

Optionally, the processing module 820 is configured to: search, based on the SPI and the SI, a forwarding table of the service function forwarding node for target forwarding entry information having the same SPI and SI; and update the target forwarding entry information based on the forwarding entry information when the target forwarding entry information is found; or store the forwarding entry information when the target forwarding entry information is not found.

Optionally, the BGP packet is a BGP update packet.

The service function forwarding node 800 according to this embodiment of the present application may correspond to a service function forwarding node in a method for forwarding a packet in the SFC according to an embodiment of the present application. In addition, the modules in the service function forwarding node 800 and the foregoing other operations and/or functions are respectively used to implement corresponding procedures of the method 300 in FIG. 6. For brevity, details are not described herein again.

Therefore, based on the service function forwarding node in this embodiment of the present application, the BGP packet delivered by the control node is received, and the packet is directly forwarded based on the forwarding entry information. Interaction between the control node and the service function forwarding node is standardized by using a mature protocol, to implement smooth interconnection between the control node and the service function forwarding node. In addition, the control plane is separated from the forwarding plane, which helps management.

Figure 12:
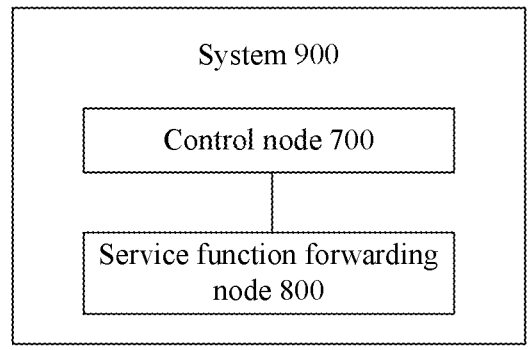
FIG. 12 is a schematic block diagram of a system for forwarding a packet in SFC according to another embodiment of the present application.

FIG. 12 is a schematic block diagram of a system 900 for forwarding a packet in SFC according to another embodiment of the present application. As shown in FIG. 12, the system 900 for forwarding a packet includes the control node 700 described in the foregoing embodiment and the service function forwarding node 800 described in the foregoing embodiment.

It should be understood that modules in the system 900 for forwarding a packet and other operations and/or functions are respectively used to implement corresponding procedures of the method 300 in FIG. 6. For brevity, details are not described herein again.

Figure 13:
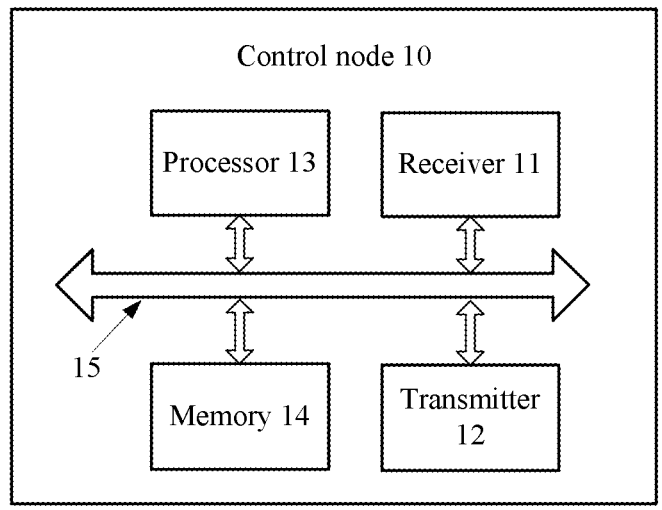
FIG. 13 is another schematic block diagram of a control node according to an embodiment of the present application.

FIG. 13 is another schematic block diagram of a control node 10 according to an embodiment of the present application. As shown in FIG. 13, the control node 10 includes a receiver 11, a transmitter 12, a processor 13, a memory 14, and a bus system 15. The receiver 11, the transmitter 12, the processor 13, and the memory 14 are connected by using the bus system 15, the memory 14 is configured to store an instruction, and the processor 13 is configured to execute the instruction stored in the memory 14, to control the receiver 11 to receive a signal and to control the transmitter 12 to send a signal.

The processor 13 is configured to determine routing entry information of a service function forwarding node in a service function path SFP in service function chaining (SFC), where the routing entry information records a mapping relationship between route prefix information and next hop information. The route prefix information includes a service path identifier (SPI) and a service index (SI), the SPI is used to identify the SFP, and the SI is used to identify a location of the service function forwarding node in the SFP. The next hop information is used to indicate a next hop node of the service function forwarding node.

The transmitter 12 is configured to send the routing entry information to the service function forwarding node, where the routing entry information is used by the service function forwarding node to generate a forwarding table, and the forwarding table is used to instruct the service function forwarding node to forward a packet.

It should be understood that in this embodiment of the present application, the processor 13 may be a central processing unit (CPU). Alternatively, the processor 13 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor. Alternatively, the processor may be any conventional processor or the like.

The memory 14 may include a read-only memory and a random access memory, and provide an instruction and data to the processor 13. A part of the memory 14 may further include a non-volatile random access memory. For example, the memory 14 may further store information about a device type.

In addition to a data bus, the bus system 15 may further include a power bus, a control bus, a status signal bus, and the like. However, for clear description, various types of buses in the figure are marked as the bus system 15.

During an implementation process, steps in the foregoing methods can be implemented by using an integrated logical circuit of hardware in the processor 13, or by using an instruction in a form of software. Steps of the location method disclosed with reference to the embodiments of the present application may be directly performed and by using a hardware processor, or may be performed and by using a combination of hardware and software modules in the processor. The software module may be located in a mature storage medium in the art, such as a random access memory, a flash memory, a read-only memory, a programmable read-only memory or an electrically erasable programmable memory, or a register. The storage medium is located in the memory 14, and the processor 13 reads information in the memory 14 and the steps in the foregoing methods in combination with hardware of the processor. To avoid repetition, details are not described herein again.

Optionally, the processor 13 is further configured to generate a Border Gateway Protocol (BGP) update packet, where the BGP update packet carries the routing entry information.

The transmitter 12 is configured to send the BGP update packet to the service function forwarding node.

Optionally, the processor 13 is configured to generate the BGP update packet, where the BGP update packet includes a multiprotocol reachable network layer reachability information (MP_REACH_NLRI) attribute field, and the MP_REACH_NLRI attribute field includes a subsequent address family identifier (SAFI) field, an NLRI field, and a next hop information field. The SAFI field indicates that the MP_REACH_NLRI attribute field is encapsulated based on an encapsulation format supported by an SFC synchronization address family, and the NLRI field includes a type-length-value (TLV) field. A type T field of the TLV field indicates that a type of the TLV field is an SFC routing entry synchronization type, and a value V field of the TLV field carries the SPI and the SI. The next hop information field carries the next hop information.

Optionally, the routing entry information further includes route attribute information, and the route attribute information includes at least one of the following traffic distribution parameter types: weight, cost, and bandwidth.

The BGP update packet further includes a BGP SFC attribute field, the BGP SFC Attribute field includes at least one sub-TLV field, and each traffic distribution parameter type corresponds to one of the at least one sub-TLV field. Each sub-TLV field includes a T field, an L field, and a V field, where the T field indicates any one of the traffic distribution parameter types, and the V field indicates a parameter used to distribute, based on a corresponding traffic distribution parameter type, traffic carried by the packet.

The control node 10 according to this embodiment of the present application may correspond to a control node in a method for forwarding a packet in the SFC according to an embodiment of the present application. In addition, the modules in the control node 10 and the foregoing other operations and/or functions are respectively used to implement corresponding procedures of the method 200 in FIG. 2. For brevity, details are not described herein again.

Therefore, based on the control node in this embodiment of the present application, the routing entry information is directly delivered to the service function forwarding node, the service function forwarding node generates the forwarding table, and interaction between the control node and the service function forwarding node is standardized by using a mature protocol, to implement smooth interconnection between the control node and the service function forwarding node.

Figure 14:
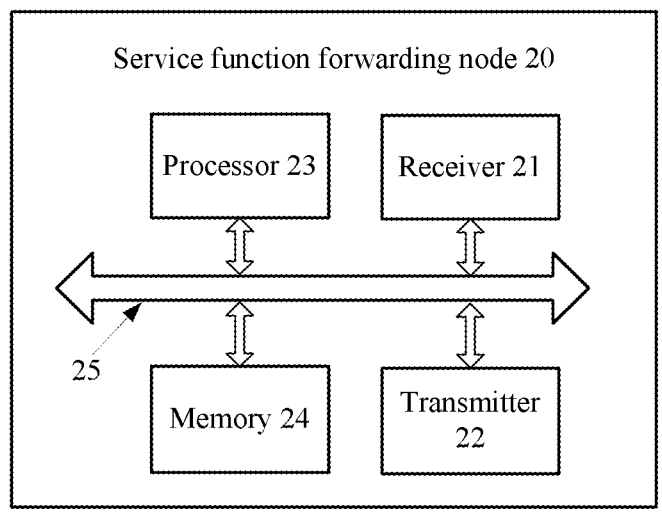
FIG. 14 is another schematic block diagram of a service function forwarding node according to an embodiment of the present application.

FIG. 14 is another schematic block diagram of a service function forwarding node 20 according to an embodiment of the present application. As shown in FIG. 14, the service function forwarding node 20 includes a receiver 21, a transmitter 22, a processor 23, a memory 24, and a bus system 25. The receiver 21, the transmitter 22, the processor 23, and the memory 24 are connected by using the bus system 25, the memory 24 is configured to store an instruction, and the processor 23 is configured to execute the instruction stored in the memory 24, to control the receiver 21 to receive a signal and to control the transmitter 22 to send a signal.

The receiver 21 is configured to receive routing entry information sent by a control node, where the routing entry information records a mapping relationship between route prefix information and next hop information. The route prefix information includes a service path identifier (SPI) and a service index (SI), the SPI is used to identify an SFP, and the SI is used to identify a location of the service function forwarding node in the SFP. The next hop information is used to indicate a next hop node of the service function forwarding node.

The processor 23 is configured to generate a forwarding table based on the routing entry information.

The transmitter 22 is configured to forward a packet based on the forwarding table.

Optionally, the receiver 21 is configured to receive a Border Gateway Protocol (BGP) update packet sent by the control node, where the BGP update packet carries the routing entry information.

Optionally, the BGP update packet includes a multiprotocol reachable network layer reachability information (MP_REACH_NLRI) attribute field, and the MP_REACH_NLRI attribute field includes a subsequent address family identifier (SAFI) field, an NLRI field, and a next hop information field. The SAFI field indicates that the MP_REACH_NLRI attribute field is encapsulated based on an encapsulation format supported by an SFC synchronization address family, and the NLRI field includes a type-length-value (TLV) field. A type T field of the TLV field indicates that a type of the TLV field is an SFC routing entry synchronization type, and a value V field of the TLV field carries the SPI and the SI. The next hop information field carries the next hop information.

Optionally, the routing entry information further includes route attribute information, and the route attribute information includes at least one of the following traffic distribution parameter types: weight, cost, and bandwidth.

The BGP update packet further includes a BGP SFC attribute Attribute field, the BGP SFC Attribute field includes at least one sub-TLV field, and each traffic distribution parameter type corresponds to one of the at least one sub-TLV field. Each sub-TLV field includes a T field, an L field, and a V field, where the T field indicates any one of the traffic distribution parameter types, and the V field indicates a parameter used to distribute, based on a corresponding traffic distribution parameter type, traffic carried by the packet.

Optionally, the processor 23 is configured to: search, based on the SPI and the SI, the routing table of the service function forwarding node for target routing entry information having the same SPI and SI; and update the target routing entry information based on the routing entry information when the target routing entry information is found; or store the routing entry information when the target routing entry information is not found.

The service function forwarding node 20 according to this embodiment of the present application may correspond to a service function forwarding node in a method for forwarding a packet in the SFC according to an embodiment of the present application. In addition, the modules in the service function forwarding node 20 and the foregoing other operations and/or functions are respectively used to implement corresponding procedures of the method 200 in FIG. 2. For brevity, details are not described herein again.

Therefore, based on the service function forwarding node in this embodiment of the present application, the routing entry information delivered by the control node is received, and the forwarding table is generated based on the routing entry information. Interaction between the control node and the service function forwarding node is standardized by using a mature protocol, to implement smooth interconnection between the control node and the service function forwarding node.

Figure 15:
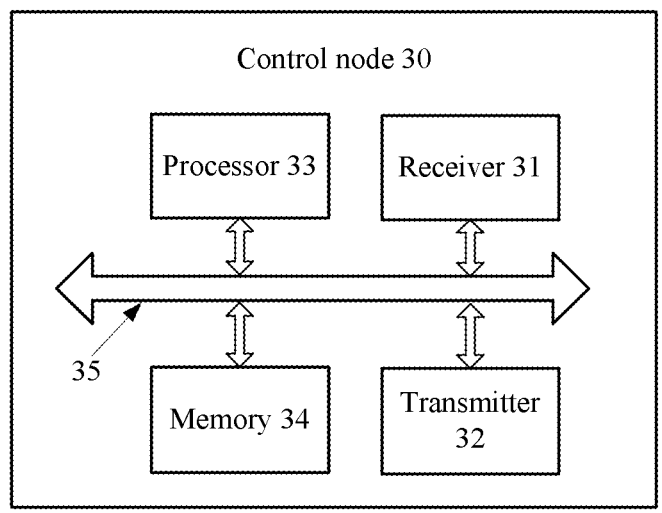
FIG. 15 is another schematic block diagram of a control node according to another embodiment of the present application.

FIG. 15 is another schematic block diagram of a control node 30 according to another embodiment of the present application. As shown in FIG. 15, the control node 30 includes a receiver 31, a transmitter 32, a processor 33, a memory 34, and a bus system 35. The receiver 31, the transmitter 32, the processor 33, and the memory 34 are connected by using the bus system 35, the memory 34 is configured to store an instruction, and the processor 33 is configured to execute the instruction stored in the memory 34, to control the receiver 31 to receive a signal and to control the transmitter 32 to send a signal.

The processor 33 is configured to determine forwarding entry information of a service function forwarding node in a service function path (SFP) in SFC, where the forwarding entry information records a mapping relationship between forwarding prefix information and next hop information. The forwarding prefix information includes a service path identifier (SPI) and a service index (SI), the SPI is used to identify the SFP, and the SI is used to identify a location of the service function forwarding node in the SFP. The next hop information is used to indicate a next hop node of the service function forwarding node.

The processor 33 is further configured to generate a Border Gateway Protocol (BGP) packet, where the BGP packet carries the forwarding entry information.

The transmitter 32 is configured to send the BGP packet to the service function forwarding node, where the forwarding entry information carried by the BGP packet is used to instruct the service function forwarding node to forward a packet.

Optionally, the processor 33 is configured to generate the BGP packet, where the BGP packet includes a multiprotocol reachable network layer reachability information (MP_REACH_NLRI) attribute field, and the MP_REACH_NLRI attribute field includes a subsequent address family identifier (SAFI) field, an NLRI field, and a next hop information field. The SAFI field indicates that the MP_REACH_NLRI attribute field is encapsulated based on an encapsulation format supported by an SFC synchronization address family, and the NLRI field includes a type-length-value (TLV) field. A type T field of the TLV field indicates that a type of the TLV field is an SFC forwarding entry synchronization type, and a value V field of the TLV field carries the SPI and the SI. The next hop information field carries the next hop information.

Optionally, the forwarding entry information further includes forwarding attribute information, and the forwarding attribute information includes at least one of the following traffic distribution parameter types: weight, cost, and bandwidth.

The BGP packet further includes a BGP SFC attribute field, the BGP SFC Attribute field includes at least one sub-TLV field, and each traffic distribution parameter type corresponds to one of the at least one sub-TLV field. Each sub-TLV field includes a T field, a length L field, and a V field, where the T field indicates any one of the traffic distribution parameter types, and the V field indicates a parameter used to distribute, based on a corresponding traffic distribution parameter type, traffic carried by the packet.

Optionally, the BGP packet is a BGP update packet.

The control node 30 according to this embodiment of the present application may correspond to a control node in a method for forwarding a packet in the SFC according to an embodiment of the present application. In addition, the modules in the control node 30 and the foregoing other operations and/or functions are respectively used to implement corresponding procedures of the method 300 in FIG. 6. For brevity, details are not described herein again.

Therefore, based on the control node in this embodiment of the present application, the forwarding entry information is directly delivered to the service function forwarding node by using the BGP packet, and the service function forwarding node can directly forward the packet based on the forwarding entry information. Interaction between the control node and the service function forwarding node is standardized by using a mature protocol, to implement smooth interconnection between the control node and the service function forwarding node. In addition, the control plane is separated from the forwarding plane, which helps management.

Figure 16:
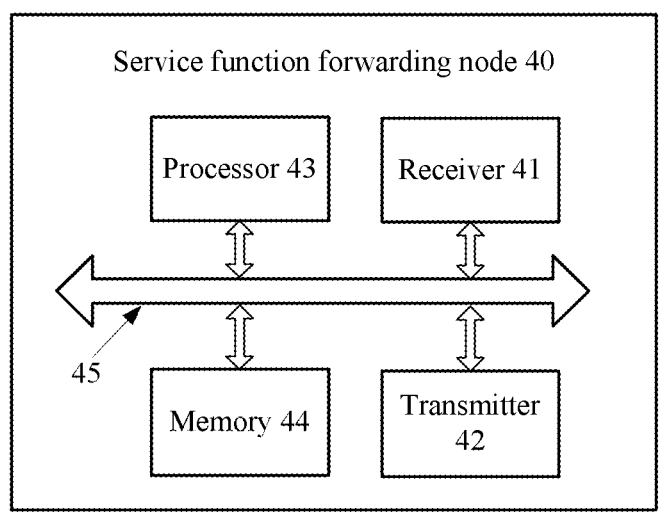
FIG. 16 is another schematic block diagram of a service function forwarding node according to another embodiment of the present application.

FIG. 16 is another schematic block diagram of a service function forwarding node 40 according to another embodiment of the present application. As shown in FIG. 16, the service function forwarding node 40 includes a receiver 41, a transmitter 42, a processor 43, a memory 44, and a bus system 45. The receiver 41, the transmitter 42, the processor 43, and the memory 44 are connected by using the bus system 45, the memory 44 is configured to store an instruction, and the processor 43 is configured to execute the instruction stored in the memory 44, to control the receiver 41 to receive a signal and to control the transmitter 42 to send a signal.

The receiver 41 is configured to receive a Border Gateway Protocol (BGP) packet sent by a control node, where the BGP packet carries forwarding entry information, and the forwarding entry information records a mapping relationship between SFC forwarding prefix information and next hop information. The SFC forwarding prefix information includes a service path identifier (SPI) and a service index (SI), the SPI is used to identify an SFP, and the SI is used to identify a location of the service function forwarding node in the SFP. The next hop information is used to indicate a next hop node of the service function forwarding node.

The transmitter 42 is configured to forward a packet based on the forwarding entry information.

Optionally, the BGP packet includes a multiprotocol reachable network layer reachability information (MP_REACH_NLRI) attribute field, and the MP_REACH_NLRI attribute field includes a subsequent address family identifier (SAFI) field, an NLRI field, and a next hop information field. The SAFI field indicates that the MP_REACH_NLRI attribute field is encapsulated based on an encapsulation format supported by an SFC synchronization address family, and the NLRI field includes a type-length-value (TLV) field. A type T field of the TLV field indicates that a type of the TLV field is an SFC forwarding entry synchronization type, and a value V field of the TLV field carries the SPI and the SI. The next hop information field carries the next hop information.

Optionally, the forwarding entry information further includes forwarding attribute information, and the forwarding attribute information includes at least one of the following traffic distribution parameter types: weight, cost, and bandwidth.

The BGP packet further includes a BGP SFC attribute field, the BGP SFC Attribute field includes at least one sub-TLV field, and each traffic distribution parameter type corresponds to one of the at least one sub-TLV field. Each sub-TLV field includes a T field, a length L field, and a V field, where the T field indicates any one of the traffic distribution parameter types, and the V field indicates a parameter used to distribute, based on a corresponding traffic distribution parameter type, traffic carried by the packet.

Optionally, the processor 43 is configured to: search, based on the SPI and the SI, a forwarding table of the service function forwarding node for target forwarding entry information having the same SPI and SI; and update the target forwarding entry information based on the forwarding entry information when the target forwarding entry information is found; or store the forwarding entry information when the target forwarding entry information is not found.

Optionally, the BGP packet is a BGP update packet.

The service function forwarding node 40 according to this embodiment of the present application may correspond to a service function forwarding node in a method for forwarding a packet in the SFC according to an embodiment of the present application. In addition, the modules in the service function forwarding node 40 and the foregoing other operations and/or functions are respectively used to implement corresponding procedures of the method 300 in FIG. 6. For brevity, details are not described herein again.

Therefore, based on the service function forwarding node in this embodiment of the present application, the BGP packet delivered by the control node is received, and the packet is directly forwarded based on the forwarding entry information. Interaction between the control node and the service function forwarding node is standardized by using a mature protocol, to implement smooth interconnection between the control node and the service function forwarding node. In addition, the control plane is separated from the forwarding plane, which helps management.

It should be understood that the term "and/or" in the specification describes only an association relationship for describing associated objects and represents that three relationships may exist. For example, A and/or B may represent the following three cases: Only A exists, both A and B exist, and only B exists. In addition, the character "/" in the specification generally indicates an "or" relationship between the associated objects.

It should be understood that sequence numbers of the foregoing processes do not mean execution sequences in the embodiments of the present application. The execution sequences of the processes should be determined based on functions and internal logic of the processes, and should not be construed as any limitation on the implementation processes of the embodiments of the present application.

A person of ordinary skill in the art may be aware that, in combination with the examples described in the embodiments disclosed in the specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented electrically, mechanically, or in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of the present application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method, comprising:
   determining, by a control node, routing entry information of a service function forwarding node in a service function path (SFP) in a service function chaining (SFC), wherein the routing entry information comprising a service path identifier (SPI), one or more service indexes (SIs) and next hop information, wherein the SPI is used to identify the SFP, each of the one or more SIs represents a service function (SF) or identifies a hop in the SFP, and the next hop information is used to indicate a next hop node of the service function forwarding node, and wherein the next hop node is a SF node or a service function forwarding node;
   generating, by the control node, a Border Gateway Protocol (BGP) update packet, wherein the BGP update packet comprises network layer reachability information (NLRI), and a type filed of the NLRI indicates that the BGP update packet comprises the routing entry information; and
   sending, by the control node, the BGP update packet to the service function forwarding node, wherein the routing entry information comprised in the BGP update packet is used by the service function forwarding node to generate a forwarding entry, and the forwarding entry is used to instruct the service function forwarding node to forward a packet.

2. The method according to claim 1, wherein the BGP update packet comprises a multiprotocol reachable network layer reachability information (MP_REACH_NLRI), and the MP_REACH_NLRI comprises the NLRI.

3. The method according to claim 1, wherein the BGP update packet comprises SFC Address Family Identifier (AFI) and Subsequent Address Family Identifier (SAFI).

4. The method according to claim 1, wherein the routing entry information further comprises route attribute information, and the route attribute information comprises at least one of the following traffic distribution parameter types: weight, cost, or bandwidth.

5. The method according to claim 4, wherein the BGP update packet further comprises a BGP SFC attribute field, the BGP SFC attribute field comprises at least one sub-TLV field, each traffic distribution parameter type corresponds to one of the at least one sub-TLV field, each sub-TLV field comprises a T field, an L field, and a V field, the T field indicates any one of the traffic distribution parameter types, and the V field indicates a parameter used to distribute, based on a corresponding traffic distribution parameter type, traffic carried by the packet.

6. The method according to claim 1, wherein the hop in the SFP is a service function forwarding node or a SF node.

7. A method, comprising:
   receiving, by a service function forwarding node, a Border Gateway Protocol (BGP) update packet, wherein the BGP update packet comprises routing entry information, wherein the routing entry information comprises a service path identifier (SPI), one or more service indexes (SIs), and next hop information, the SPI is used to identify an SFP, each of the one or more SIs is used to represents a service function (SF) or identifies a hop in the SFP, and the next hop information is used to indicate a next hop node of the service function forwarding node, and wherein the next hop node is a service function (SF) node or a service function forwarding node;
   generating, by the service function forwarding node, a forwarding entry according to the routing entry information, wherein the forwarding entry comprises the SPI, the one or more Sis, and the next hop information; and
   forwarding a packet according to the forwarding entry.

8. The method according to claim 7, wherein the BGP update packet comprises a multiprotocol reachable network layer reachability information (MP_REACH_NLRI), and the MP_REACH_NLRI comprises the NLRI.

9. The method according to claim 7, wherein the BGP update packet comprises SFC Address Family Identifier (AFI) and Subsequent Address Family Identifier (SAFI).

10. The method according to claim 7, wherein the hop in the SFP is a service function forwarding node or a SF node.

11. A control node, comprising:
    at least one processor;
    one or more memories coupled to the at least one processor and storing instructions for execution by the at least one processor, wherein the at least one processor executes the instructions to cause the control node to:

determine routing entry information of a service function forwarding node in a service function path (SFP) in a service function chaining (SFC), wherein the routing entry information comprises a service path identifier (SPI), a service index (SI) and next hop information, the SPI is used to identify the SFP, each of the one or more SIs represents a service function (SF) or identifies a hop in the SFP, and the next hop information is used to indicate a next hop node of the service function forwarding node, and wherein the next hop node is a service function (SF) node or a service function forwarding node;

generate, a Border Gateway Protocol (BGP) update packet, wherein the BGP update packet comprises network layer reachability information (NLRI), and a type filed of the NLRI indicates that the BGP update packet comprises the routing entry information; and send the BGP update packet to the service function forwarding node, wherein the routing entry information comprised in the BGP update packet is used by the service function forwarding node to generate a forwarding entry, and the forwarding entry is used to instruct the service function forwarding node to forward a packet.

12. The control node to claim 11, wherein the BGP update packet comprises a multiprotocol reachable network layer reachability information (MP_REACH_NLRI), and the MP_REACH_NLRI comprises the NLRI.

13. The control node according to claim 11, wherein the BGP update packet comprises SFC Address Family Identifier (AFI) and Subsequent Address Family Identifier (SAFI).

14. The control node according to claim 11, wherein the routing entry information further comprises route attribute information, and the route attribute information comprises at least one of the following traffic distribution parameter types: weight, cost, or bandwidth.

15. A service function forwarding node, comprising:
at least one processor;
one or more memories coupled to the at least one processor and storing instructions for execution by the at least one processor, wherein the at least one processor executes the instructions to cause the service function forwarding node to:

receive a Border Gateway Protocol (BGP) update packet, wherein the BGP update packet comprises routing entry information sent by a control node, wherein the routing entry information comprises a service path identifier (SPI), one or more service indexes (SIs) and next hop information, the SPI is used to identify an SFP, each of the one or more SIs is used to represents a service function (SF) or identifies a hop in the SFP, and the next hop information is used to indicate a next hop node of the service function forwarding node, and wherein the next hop node is a service function (SF) node or a service function forwarding node;

generate, a forwarding entry according to the routing entry information, wherein the forwarding entry comprises the SPI, the one or more SIs and the next hop information; and forward a packet according to the forwarding entry.

16. The service function forwarding node according to claim 15, wherein the BGP update packet comprises a multiprotocol reachable network layer reachability information (MP_REACH_NLRI), and the MP_REACH_NLRI comprises the NLRI.

17. The service function forwarding node according to claim 15, wherein the BGP update packet comprises SFC Address Family Identifier (AFI) and Subsequent Address Family Identifier (SAFI).

18. The service function forwarding node according to claim 15, wherein the routing entry information further comprises route attribute information, and the route attribute information comprises at least one of the following traffic distribution parameter types: weight, cost, or bandwidth.

19. The service function forwarding node according to claim 16, wherein the BGP update packet further comprises a BGP SFC attribute field, the BGP SFC attribute field comprises at least one sub-TLV field, each traffic distribution parameter type corresponds to one of the at least one sub-TLV field, each sub-TLV field comprises a T field, an L field, and a V field, the T field indicates any one of the traffic distribution parameter types, and the V field indicates a parameter used to distribute, based on a corresponding traffic distribution parameter type, traffic carried by the packet.

20. The service function node according to claim 15, wherein the hop in the SFP is a service function forwarding node or a SF node.

* * * * *